United States Patent [19]

Lesea et al.

[11] 4,256,928
[45] Mar. 17, 1981

[54] TELEPHONE CALL DIVERTING AND ANSWERING SYSTEM

[75] Inventors: Ronald A. Lesea, Rodeo; Barrie Luttge, Fremont; Austin H. Lesea, Richmond, all of Calif.

[73] Assignee: Durango Systems, Inc., San Jose, Calif.

[21] Appl. No.: 80,169

[22] Filed: Sep. 28, 1979

[51] Int. Cl.³ .............................................. H04M 3/54
[52] U.S. Cl. ........................... 179/18 BE; 179/27 FH
[58] Field of Search ...................... 179/18 BE, 27 FH

[56] References Cited
U.S. PATENT DOCUMENTS
4,117,270  9/1978  Lesea .............................. 179/18 BE

*Primary Examiner*—Thomas A. Robinson
*Attorney, Agent, or Firm*—Thomas E. Schatzel

[57] ABSTRACT

A telephone call diverting and answering system. The system includes a telephone call concentrator for diverting a telephone call placed at a telephone set at one of a number of calling stations, from a telephone line connected to the intended telephone set, at one of a large number of called stations, to one of a small number of telephone trunks leading to sets at a number of answering stations. The system further includes an operator console at each answering station, and a traffic director for assigning the call to a particular station by causing the identity of the called station and the number of the diverting trunk to be displayed on the operator console of the assigned answering station.

11 Claims, 12 Drawing Figures

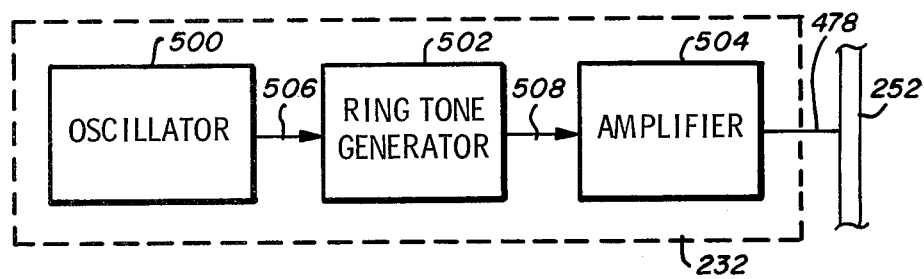
Fig_6
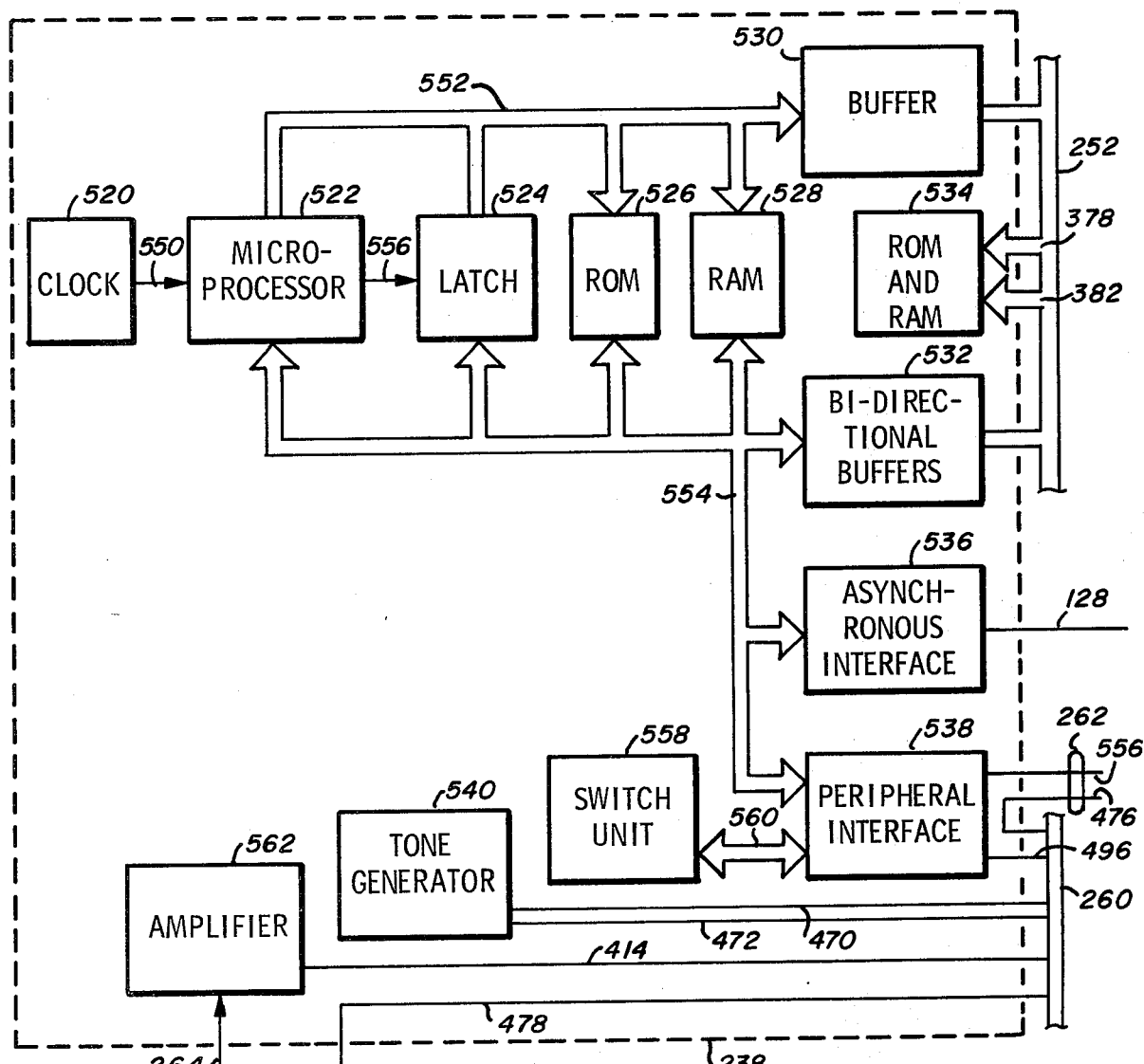
Fig_7

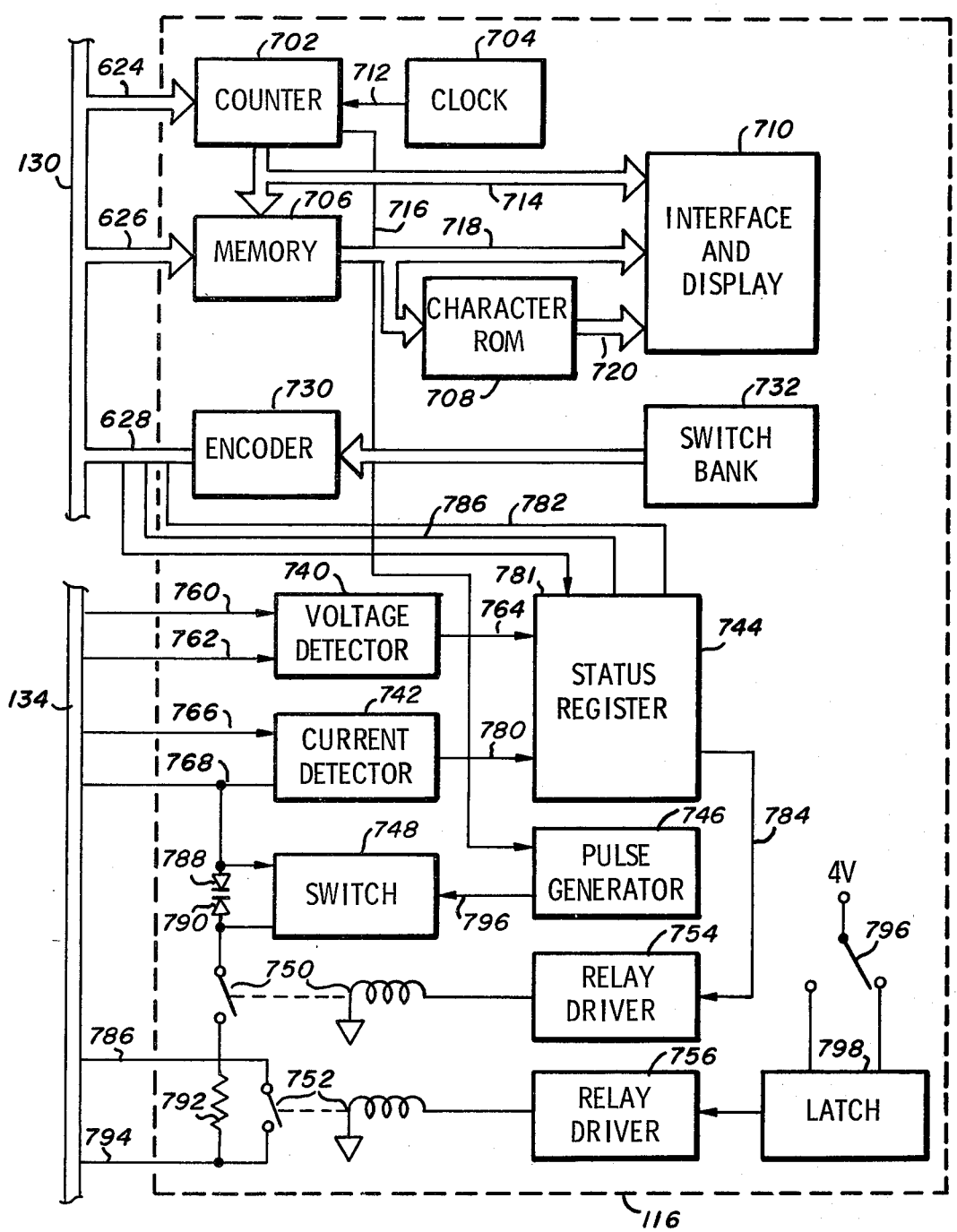
Fig_9

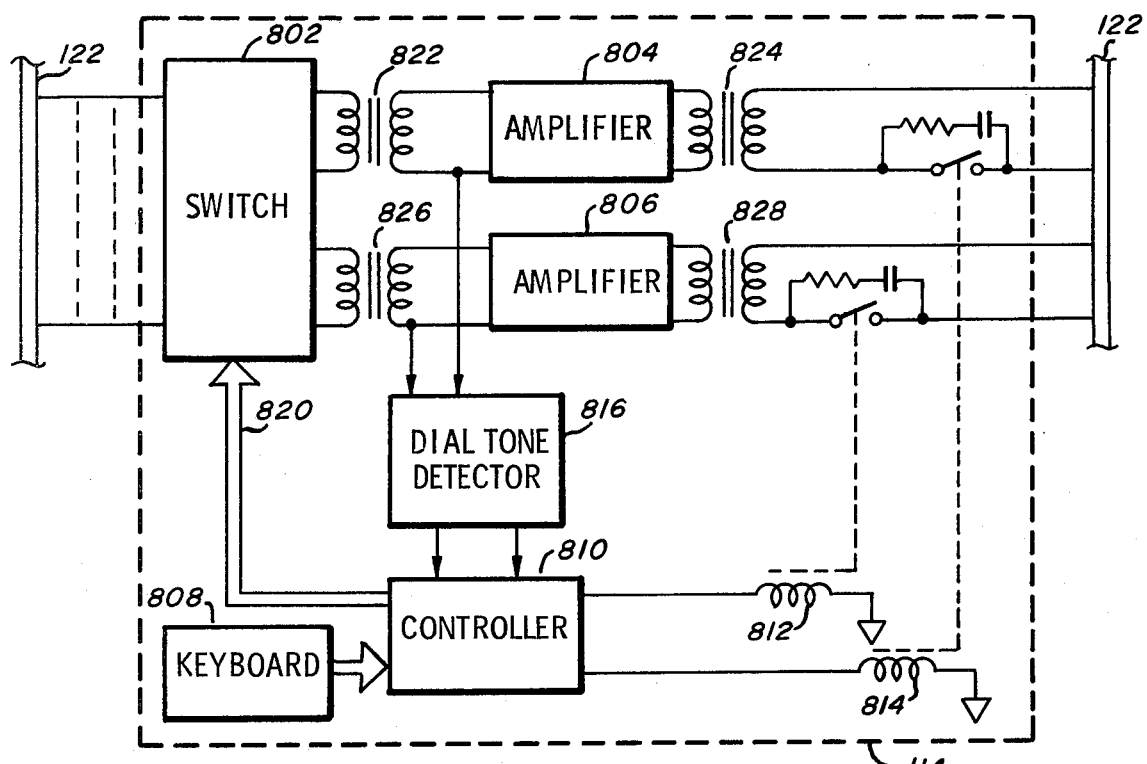
Fig_10
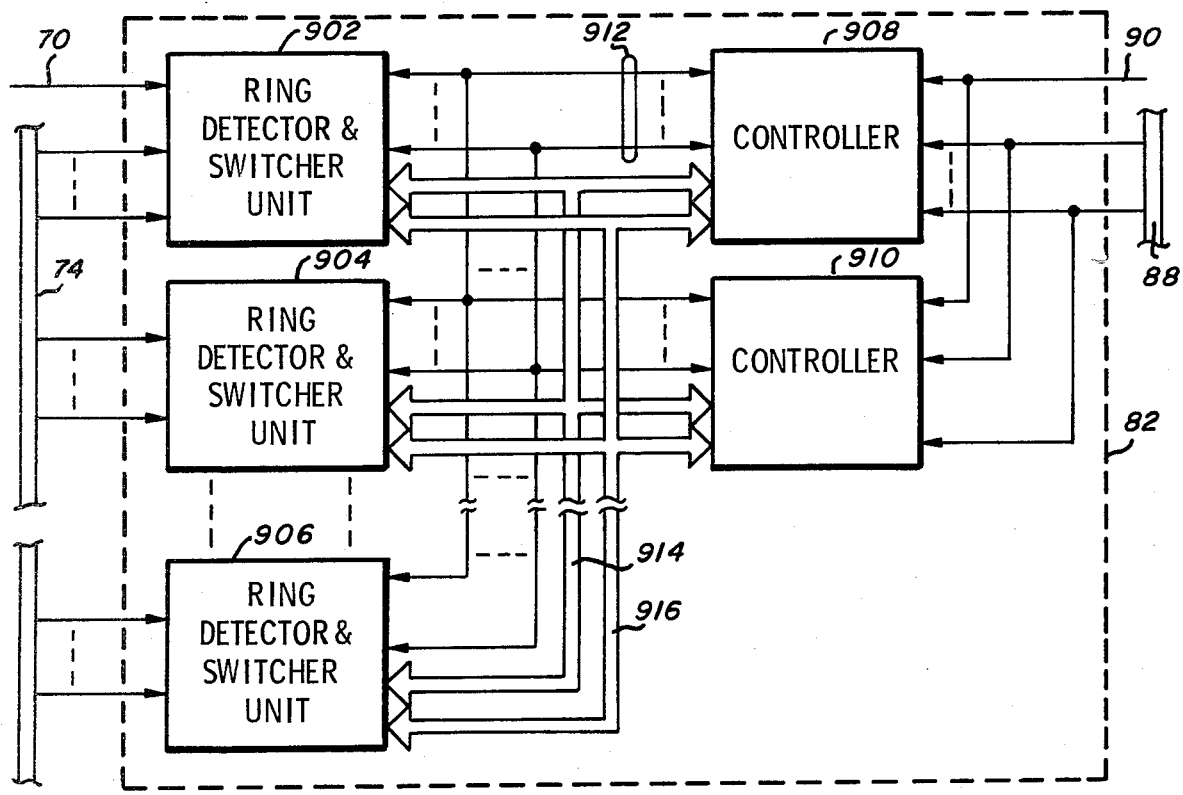
Fig_11

TELEPHONE CALL DIVERTING AND ANSWERING SYSTEM

BACKGROUND OF THE INVENTION

1. Field of the Invention

The present invention relates generally to telephone systems and more particularly to a telephone call diverting and answering system having the capability of automatically identifying and assigning telephone calls which have been concentrated onto a reduced number of telephone trunks.

2. Description of the Prior Art

The telephone system provides a vital means of rapid interpersonal communication. Unfortunately, the effectiveness of the basic system is a direct function of the availability of the party being called. To supplement the system a number of telephone call diverting and/or telephone answering systems have been developed. One type of prior art answering system answers incoming telephone calls and delivers a prerecorded taped message. Thereafter, the calling party is provided an opportunity to leave a message which is taped for later review by the called party.

Although providing a great potential, such answering systems have been rather poorly received by callers who, no doubt, resent the impersonal and intimidating nature of such systems. Additionally, it is felt that these systems project a rather poor business image. And, of course, such systems are incapable of selectively processing priority calls.

A more human touch is provided by telephone answering services or bureaus. In one implementation, the answering bureau is directly connected to each of its customer's telephone lines such that ringing occurs at both locations. Typically, the bureau is instructed to answer all telephone calls which the called party does not answer promptly, e.g., within three rings. Since the profitability of most answering bureaus is predicated upon having many customers, this implementation requires that the bureau have an equally large number of dedicated lines. The lines are connected, typically in groups of 80 to 100, to individual switchboards and each switchboard is monitored by a bureau operator.

Besides the obvious expense involved in maintaining a large number of dedicated lines, this implementation is not cost effective in terms of bureau staff. At most times, an individual operator is required to monitor each switchboard. At slack times the individual operators do not have a great deal of activity and thus their time is not sufficiently productive. However, at peak activity time periods, the same operators may be unable to properly count the number of rings of individual calls and then properly answer all of the incoming calls. Further, it is very difficult for an operator on one switchboard with few calls to assist another operator on another switchboard who is unable to handle a sudden flurry of calls on that particular operator's board.

A form of telephone call diverting, referred to as "telephone call forwarding," is provided by some telephone companies in geographic areas in which the company employs electronic signal switching (ESS). A person with this service can cause future incoming telephone calls to be diverted automatically to a telephone set at a different location of that person's choice. For example, this location may be where the person plans to be or even to a telephone answering bureau.

The use of telephone call forwarding to forward calls to an answering bureau would be attractive to the bureau in that it could greatly reduce the number of lines required by the bureau. In addition, the reduced number of lines could each be connected to a number of key-type telephone sets permitting better bureau staffing and sharing of the call load.

Unfortunately, without more, such a reduction in the number of lines would be at the expense of the quality of service offered to the answering bureau's clients. For one thing, telephone call forwarding requires that the user, the bureau's client, properly switch the system over to call forwarding and back to normal operation. More important, since a few lines would be used to handle the calls of all of the bureau's numerous clients, the bureau would lose the ability to identify for which client a particular call is intended. Thus, the bureau could no longer answer each call in the personal manner in which its clients would, such as "Doctor Jones' office". The bureau operator would be forced to guess or ask calling parties who they are calling.

A system for telephone call diverting and answering which addresses these problems is disclosed in the United States Pat. No. 4,117,270 issued to Ronald A. Lesea, one of the present inventors. The system includes a number of telephone call diverters located upon the premises of the various clients of the telephone answering bureau, and one or more telephone call diverter controller/decoders located on the bureau's premises. Each of the call diverters requires two telephone lines, the first of which it monitors for incoming telephone calls. Until such a call is received, the call diverter remains in an idle mode.

When a call diverter detects a ringing signal generated by the telephone company upon the first line, the call diverter signals on off-hook condition on the second line by conducting an off-hook current between the tip and ring line thereof. It then monitors the second line to detect a dial tone signal generated thereon by the telephone company. Upon detecting such a signal, the call diverter pulses the line in such a manner as to dial the telephone number of the answering bureau. Thereafter, it repetitiously generates an identification signal upon the line.

The identification signal represents a unique three-digit code assigned to the respective client. The signal is generated a digit at a time using the standard two-of-seven tone code used for dual tone multi-frequency dialing. After each group of three digits has been transmitted and before the group is repeated, the call diverter briefly monitors the line for a connect-type handshake signal, i.e., the two-of-seven code signal which represents the "*" symbol. It should be noted that until such a handshake signal is detected by the call diverter, the call diverter does not signal an off-hook condition on the first line. Thus, the telephone company continues to generate the ringing signal on the first line, and the calling party is not apprised of the above-described activity.

Upon detection of the above-mentioned handshake signal, the call diverter causes transmission of the identification signal, signals an off-hook condition on the first line and bridges the two lines coupling audio signals therebetween.

Thereafter, the call diverter monitors both lines for dial tone signal and for a disconnect handshake signal, i.e., the two-of-seven code signal which represents the "#" symbol. Upon detection of either signal or after a thirty-minute period has elapsed, the call diverter signals an on-hook condition on both lines and returns to the idle mode.

The one or more call diverter controller/decoders, that are located at the answering bureau's premises, may be connected to respective telephone sets or telephone key sets such that they monitor whatever line the operator selects. When properly connected, and when an operator selects a line upon which a call is being diverted by an above-mentioned call diverter, both the operator and the call diverter controller/decoder receive the three-digit identification code signal transmitted by the call diverter. The call diverter controller/decoder decodes the identification signal and displays the three-digit code which the operator may use to identify the client for which the respective call is intended. When ready, the operator can cause the connect-type handshake signal to be generated, either by depressing the appropriate key on the call diverter controller/decoder or the "*" key on the telephone set, and greet the caller in the appropriate fashion, such as, "Dr. Jones' office."

As can be seen, the above-described prior art system enables telephone answering bureaus to greatly reduce the number of telephone lines which must be maintained and associated employee expenses, while retaining the ability to properly greet clients' callers. Additionally, this system provides a degree of flexibility in that any operator can answer any call.

Although providing improvement over other prior art telephone call diverting and answering systems, the system of U.S. Pat. No. 4,117,270 lacks a degree of desirable automation. The system has no provision for counting rings or assigning calls either on a rotational or weighted basis. Also, the disclosed system is incompatible with many of the other systems, such as the electronic signal switching call forwarding. Finally, no means is provided for automatically obtaining statistics with respect to answered calls.

Though not prior art in itself, a telephone call concentrator is disclosed in the Institute of Electrical and Electronics Engineers, Inc. (IEEE), "Transactions on Communications," Volume COM-27, Number 7, of July 1979, on pages 973-978 which may be of interest.

SUMMARY OF THE PRESENT INVENTION

It is therefore an object of the present invention to provide a telephone call diverting and answering system which concentrates telephone calls on a large number of telephone lines onto a relatively small number of lines while automatically timing, identifying and assigning the calls.

Another object of the present invention is to provide a telephone call diverting and answering system which is compatible with electronic signal switching telephone call forwarding and other diverting devices.

Briefly, the preferred embodiment of the present invention includes a telephone call concentrator for detecting on one of a large number of telephone lines which are connected to telephone sets at respective called stations a call placed at a set at one of a number of calling stations. The concentrator is responsive to a ringing signal on an active one of the monitored lines and selects, from a small number of trunks, an idle trunk. The concentrator then develops a line identifying signal. Responsive to a connect signal developed on the selected trunk, the active line is bridged to the selected trunk. The embodiment further includes a key telephone set for connection to each of the trunks and an operator console positioned at each of a number of answering stations, and a console driving traffic controller for monitoring the trunks. The traffic controller is responsive to the line identifying signal and operative to select an idle answering station and to generate signals causing the number of the selected trunk and the identity of the active line to be displayed on the operator console at the selected answering station. The traffic controller, responsive to the displayed connection of the selected trunk to the selected answering station, develops the connect signal whereby calls are diverted without a calling party being advised of the diversion in such a fashion that the identity of the called station is maintained.

Additionally, the traffic controller is compatible with a number of prior art devices, such as electronic signal switching telephone call forwarding, which divert calls from lines connected to sets at called stations to trunks connected to the sets at the various answering stations. The present traffic controller is responsive to a call on such a trunk and operative to assign the call to an idle answering station by generating signals causing the number of the trunk and the identity of the called station to be displayed on the operator console at the selected answering station. The controller is then responsive to the connection of a set at an answering station to the diverting trunk and operative to develop those handshake signals required by the diverting device.

An important advantage of the present invention is its level of automation.

Another advantage of the present invention is its compatibility with other telephone call diverting devices.

Still another advantage of the present invention is the ability to automatically concentrate calls on a large number of lines onto a few telephone lines while preserving the identify of each call.

These and other objects and advantages of the present invention will no doubt become apparent to those skilled in the art after having read the following detailed description of the preferred embodiment which is illustrated in the several drawing figures.

IN THE DRAWINGS

FIG. 6 is a block diagram illustrating the ring back generator shown in FIG. 2;

FIG. 7 is a block diagram illustrating the central processing unit shown in FIG. 2;

FIG. 9 is a block diagram of an operator console for use in a telephone call diverting and answering system;

FIG. 10 is a block diagram of a telephone patcher for use in a telephone call diverting and answering system;

FIG. 11 is a block diagram of a telephone call concentrator for use in a telephone call diverting and answering system.

DETAILED DESCRIPTION OF THE PREFERRED EMBODIMENT

Figure 1:
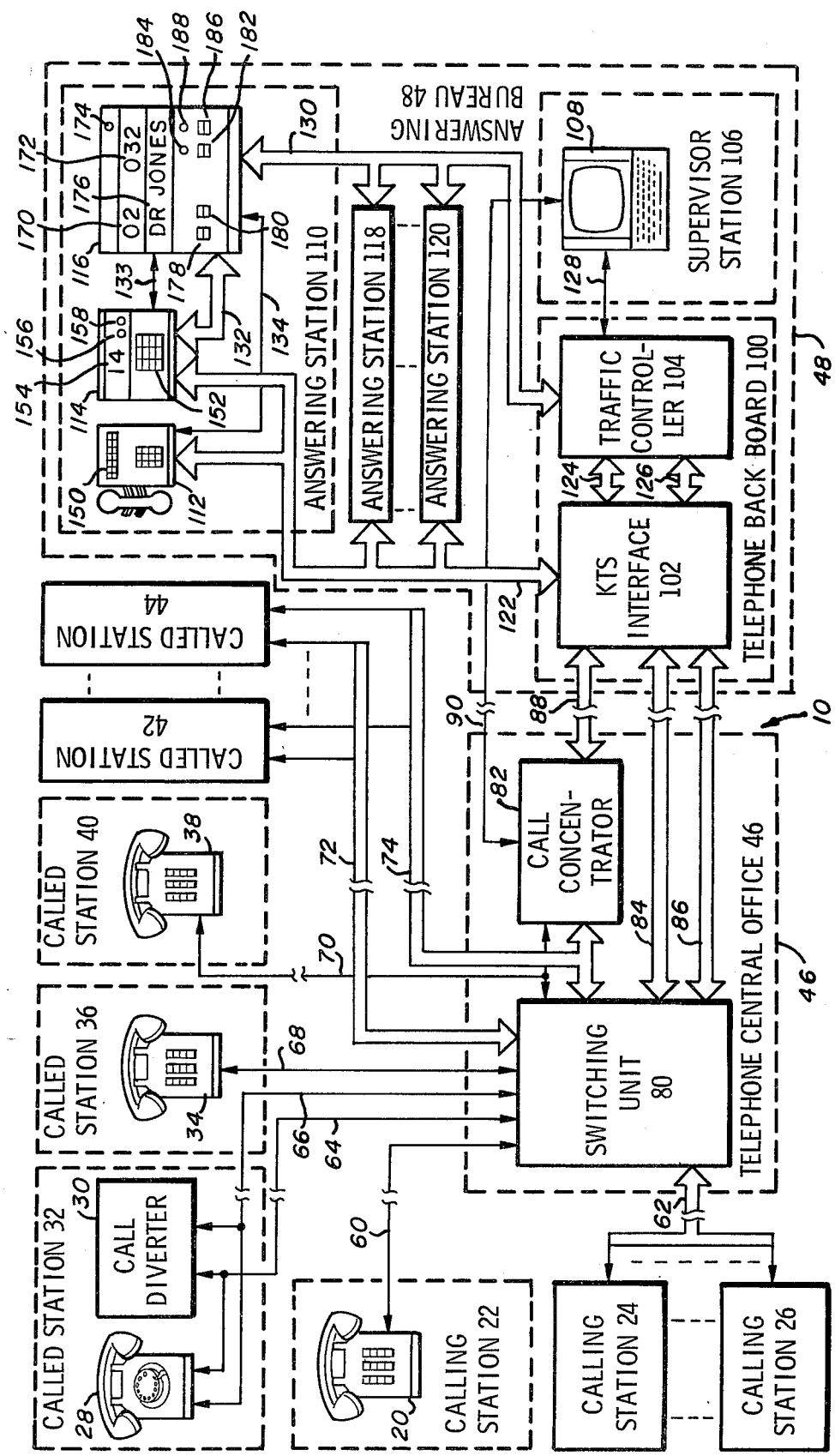
FIG. 1 is a combined perspective view and block diagram of equipment and circuitry of a telephone call diverting and answering system in accordance with the present invention.

A combined perspective and block diagram of a telephone call diverting and answering system in accordance with the present invention is illustrated in FIG. 1 and referred to by the general reference character 10. The illustrated system 10 includes a telephone set 20 at a calling station 22, a plurality of sets at a plurality of calling stations 24 through 26, a set 28 and a telephone call diverter 30 at a called station 32, a set 34 at a called station 36, a set 38 at a called station 40, a plurality of sets at a plurality of called stations 42 through 44, a telephone central office 46, and a telephone answering bureau 48.

Telephone set 20, like sets 28, 34 and 38, is a conventional telephone set of the type which is known in the art and which is usually supplied by local public telephone companies, e.g., the Bell Telephone System. Set 20 is connected to the telephone central office 46 by a telephone line 60 which includes those lines referred to as tip and ring and, when appropriate, optional lines as may be required by the set.

In the illustrated embodiment, an almost unlimited number of telephone sets at respective calling stations, illustrated as calling stations 24 through 26, may be employed. These sets are connected to the telephone central office 46 by a plurality of telephone lines forming a cable 62.

For proper operation, the telephone call diverter 30 requires the use of two telephone lines—one line for receiving incoming telephone calls and another line on which calls are forwarded. For this reason, the telephone set 28 is preferably of the key-type capable of being connected to two or more lines, including a line 64 and a line 66 which connect the set 28 to telephone call diverter 30 and to the telephone central office 46. To exemplify the compatibility of telephone call diverter 30 with telephone exchanges which require rotary-type dialing, set 28 is illustrated as being of the rotary dial variety, i.e., one which pulses the line by interrupting the connection between the tip and ring lines so as to dial a telephone number.

Telephone call diverter 30 is of the type described in detail in the United States Pat. No. 4,117,270 granted to Ronald A. Lesea. In general, when activated, the diverter 30 monitors telephone line 63 for a ringing signal generated thereon by telephone central office 46. Upon detecting such a signal, diverter 30 signals the telephone central office 46 in the manner of a telephone set in the off-hook state by bridging the tip and ring lines of line 66 so as to permit a DC current to flow therebetween. Next, diverter 30 monitors line 66 for a dial tone signal generated thereon by the telephone central office 46.

When a dial tone signal is detected on line 66, call diverter 30 pulses the connection between the tip and ring lines of telephone line 66 so as to dial the preassigned telephone number of answering bureau 48. Thereafter, it continuously and repetitiously generates on line 66 a preassigned identification signal consisting of three dual tone multi-frequency signals of the type commonly used in telephone number dialing followed by a brief pause before the identification signal is repeated. During each pause, diverter 30 monitors line 66 for a connect-type handshake signal in the form of a dual tone multi-frequency signal representing the "*" symbol.

When a connect-type handshake signal is detected, telephone call diverter 30 bridges telephone line 64 to line 66 to signal an off-hook state and to couple audio signals therebetween. Thereafter, diverter 30 monitors the two lines for a dial tone signal and a disconnect-type handshake signal in the form of a dual tone multi-frequency signal representing the "#" symbol. Upon detection of either signal or after a thirty-minute period has elapsed, the call diverter signals an on-hook state by removing the bridge between lines 64 and 66 and again monitors line 64 for an incoming call.

Telephone set 34 at called station 36 is connected to telephone central office 46 by means of a telephone line 68. After a preassigned telephone-forwarding number for answering bureau 48 has been properly entered into set 34, telephone calls directed to this set are automatically diverted by the telephone central office 46 to the telephone answering bureau 48 by means of a trunk designated by the forwarding number in a fashion which is known in the art as "telephone call forwarding."0 Telephone set 38, which is connected to telephone central office 46 by a line 70, is connected to the telephone central office and telephone answering bureau 48 so that telephone calls directed to set 38 are also, simultaneously, coupled to the telephone answering bureau in a fashion which will be hereafter described.

A plurality of telephone sets at called stations 42 through 44, employing various means for telephone call diverting, such as those just described, are connected to the telephone central office 46 by means of a plurality of telephone lines forming a cable 72 and a plurality of telephone lines forming a cable 74. Obviously, each such set employing a call diverter similar to diverter 30 uses at least a pair of lines of cable 72, those employing call forwarding use one or more lines of cable 72 and those which are parallel connected to answering bureau 48 use one or more lines of cable 74.

Telephone central office 46 is illustrated as having a switching unit 80 and a telephone call concentrator 82. Switching unit 80 is connected to telephone lines 60, 64, 66, 68, and 70; to cables 62, 72 and 74; a plurality of loop start trunks forming a cable 84; and to a plurality of trunks of the direct inward dialing (DID) variety forming a cable 86. For each three to six trunks of cable 86 connecting the telephone central office 46 to the answering bureau 48, a block of 100 unique telephone forwarding numbers are assigned. Each forwarding number is assigned for use by a different answering bureau client in forwarding telephone calls. Switching unit 80, at least in part, employs electronic signal switching (ESS) as necessary to provide telephone call forwarding with respect to calls intended for telephone set 34 and appropriate sets of those at called stations 42 through 44.

Switching unit 80 monitors the current flowing through telephone lines 60, 66 and the lines forming cable 62 to detect an off-hook current flowing therein. When such a current is detected, unit 80 generates a dial tone on the respective line and monitors the line for a dialing signal in the form of pulses in the off-hook current or dual tone multi-frequency tones. Responsive to either type of dialing signal, switching unit 80 generates a ringing signal upon the designated line, or trunk, e.g., line 64, line 70, one of the lines forming cable 72, or one of the trunks forming cable 84, and monitors the designated line or trunk for an off-hook current flowing therethrough. When such occurs, the unit 80 discontinues the generation of the ringing signal and bridges the two lines or the line and the trunk so as to couple audio frequency signals therebetween.

When line 68 or an appropriate one of the lines forming cable 74 is designated by the dialing signal, after a proper telephone forwarding number has been entered into the respective telephone set, switching unit 80 generates a brief ringing signal on the designated line. Next, unit 80 selects a trunk of those which form cable 86 that corresponds to the telephone forwarding number and pulses the trunk in the proper direct inward dialing (DID) fashion so as to dial the last three digits of the telephone forwarding number. Finally, upon detecting a battery reversal signal at the distal end of the selected forwarding trunk, switching unit 80 bridges the calling line and the selected forwarding trunk so as to couple audio signals therebetween.

Telephone call concentrator 82 is connected to the switching unit 80 by means of line 70 and the lines which form cable 74. Concentrator 82 is connected to telephone answering bureau 48 by a plurality of dedicated outgoing loop start trunks forming a cable 88 and by an optional RS-232 type data line 90. In the preferred embodiment, concentrator 82 can handle up to 768 incoming lines and up to sixteen outgoing trunks.

In general, concentrator 82, which is discussed in detail hereafter, continuously scans incoming telephone line 70 and the lines which form cable 74 monitoring each line for the presence of a ringing signal. Upon locating an active incoming line, i.e., one upon which such a signal is being generated, concentrator 82 generates a signal upon line 90 which identifies the active line and monitors line 90 for an answering signal representing a preassigned ring count for the active line. At the same time, the concentrator 82 counts the number of rings of the ringing signal generated upon the line 90. After concentrator 82 has counted the specified number or rings, or in the case when no ring count has been supplied via line 90 after three rings, the concentrator scans the trunks of cable 88 to locate an idle trunk. Once an idle trunk is located the concentrator 82 generates a ringing signal thereon. When concentrator 82 detects an off-hook current flow on the selected trunk, it transmits thereon an identification signal of the form which is generated by call diverter 30, i.e., a signal which identifies the active incoming line. The concentrator 82 then monitors the selected outgoing trunk for a compatible handshake signal of the type recognized by the telephone call diverter 30. Upon detection of a handshake signal, concentrator 82 signals an off-hook condition on the active incoming line by bridging the line and the selected outgoing trunk so as to couple audio signals therebetween. Finally, concentrator 82 monitors the selected outgoing trunk for a sustained drop in the off-hook current. When such a drop is detected, concentrator 82 removes the audio bridge between the incoming line and the outgoing trunk which also signals an on-hook condition on the incoming line.

When concentrator 82 is unable to locate an idle outgoing trunk for an incoming call, the concentrator continues its search without taking action with respect to the incoming line until either an idle trunk is located or until the ringing signal generated upon the incoming line ceases.

In the embodiment 10, the call concentrator 82 is located at the telephone central office. Obviously in situations in which dedicated telephone lines, e.g,, line 70 and the lines which form cable 74, are already in place and extend from the telephone central office to the answering bureau, it may be desirable to locate the concentrator at the answering bureau. Also, if many telephone lines extend to a called station or many called stations are connected to a remote telephone central office, the call concentrator may be located at the called station or the remote central office, respectively.

Answering bureau 48, as illustrated, includes a telephone backboard 100 having a key telephone set interface 102 and a traffic controller 104, a supervisor station 106 optionally having an intelligent video terminal 108, an answering station 110 having a key telephone set 112, an optional telephone patcher 114 and an operator console 116, and a plurality of answering stations 118 through 120 each of which is similar to answering station 110. Key telephone set interface 102 is of the type which is known in the art and which includes those telephone company-supplied components used to interface key telephone set 112 and the similar sets at answering stations 118 through 120 to the trunks which form cables 84, 86 and 88. The interface is designed to perform a number of common functions, such as putting a telephone call on hold.

More specifically, interface 102 includes a number of blocks for interconnecting the wires of the various trunks, lines, and interface components, including loop start trunk blocks, direct inward dialing (DID) trunk blocks, DID interface circuit blocks, a key telephone unit (KTU), a KTU trunk interface, and a KTU customer circuit interface. The key telephone unit is connected by means of the KTU interface and loop start trunk blocks to the loop start trunks forming cables 84 and 88 and by means of the KTU interface, the DID interface blocks, and the DID trunk blocks to the DID trunks forming cable 86. The KTU customer interface, which is also connected to the key telephone unit, is connected to the various key telephone sets and telephone patchers, including set 112 and patcher 114 by a number of telephone lines which form a cable 122. KTU interface is connected to traffic controller 104 by a number of loop start trunks which form a cable 124, and to the DID circuit interface blocks, which are also connected by means of a number of DID trunks which form a cable 126 to the traffic controller 104. Each of the lines forming cable 122 include those lines which are designated tip, T and T1, ring, R and R1, A and A1.

Traffic controller 104 is additionally connected by means of an RS-232 line 128 to the video terminal 108 and by a bus 130 to the various operator consoles including console 116. Console 116 is connected to its respective patcher by bus 132 and a line 133, and to its respective key telephone set by an RJ-35X cable 134.

Controller 104, which is discussed in further detail below, monitors the signals developed on bus 130 to determine the status of each of the various answering stations, including whether each station is currently processing a call, is available to process a call, or is out of service. Controller 104 also monitors the trunks of cables 124 and 126 to detect incoming telephone calls. Upon sensing a ringing signal generated on one of the loop start trunks which form cable 124, traffic controller 104 bridges the active trunk so as to signal an off-hook condition and monitors the trunk for an identification signal of the type generated by call diverter 30 and call concentrator 82. When received, the identification signal is decoded to provide a called station number. The DID trunks of cable 126 are also monitored for the presence of dialing pulses of the call forwarding type which signal an incoming telephone call on the active trunk. When detected, the dialing pulses are counted by traffic controller 104 to provide a called station number.

Whether obtained from a loop start trunk or a DID trunk, the called station number is transmitted to terminal 108 by means of line 128 and the line is monitored for a replay signal which specifies an answering message. Additionally, controller 104 tests an internal message waiting register and a special instruction register which are indexed by the called station number. The status of these registers along with the number of the active trunk, the called station number and, if received, the answering message are coupled by bus 130 to an operator console at one of the answering stations 110 and the stations 118 through 120 which the traffic controller selects to process the next telephone call.

Traffic controller 104 is operative to select an answering station to process the next call based upon the status of the various stations and whether a democratic or priority scheme has been selected. Obviously, if only one station is available, in service and is not already processing a call, this station is selected to receive the next call. If two or more stations are available, in the democratic mode that station is selected which has been available the longest. In the priority mode, if a designated priority station is available, then it is selected to receive the call.

The processing of calls when no stations are available depends upon whether an automatic answering mode has been selected. In the automatic answering mode, controller 14 answers the call on the active trunk by generating the appropriate connect-type handshake signal on a loop start trunk or by reversing the battery potential on a DID trunk. The controller then plays a prerecorded message, places the trunk on hold, and couples music thereto. As a station becomes available, controller 104 routes that call which has been on hold the longest to the available station. When automatic answering is not employed, controller 104 assigns that call which has been waiting the longest to the answering station which has been busy the longest. When one or more calls are waiting, or on hold, traffic controller 104 so notifies all operator consoles by means of signals developed on bus 130.

When signals on bus 130 indicate that a change in the status has occurred at one of the answering stations, such as for instance, that key telephone unit 112 has been connected to one of the lines of cable 122, traffic controller 104 signals the respective operator console, i.e., console 116, to generate a series of short pulses on the off-hook line. Simultaneously, controller 104 scans each of the trunks which form cables 124 and 126 in order to detect the pulses and thereby identify the line. Should controller 104 determine that the key telephone set at the answering station which was selected to take the next call has been connected to a line other than the specified line or that the next call has been taken at a non-selected answering station, the controller updates the signals on bus 130 to supply the proper called station number, associated answering message, and related information to the operator console involved.

Optional terminal 108 is an intelligent video terminal of the type designated HP2649A by the Hewlett Packard Company. The terminal has a number of registers which are indexed by assigned called station numbers and in which are stored ring count numbers and answering messages.

Terminal 108 is connected to call concentrator 82 by an RS-232 line 90 and to traffic controller 104 by RS-232 line 128. When provided with a called station number by means of signals generated on line 90 or line 128, terminal 108 generates on the respective line a signal which corresponds to the associated ring count or the associated answering message. Additionally, terminal 108 is provided, by controller 104, parameters describing the disposition of each call. From these parameters, terminal 108 generates statistics including: the total number of telephone calls answered at each called station; the total number of calls placed on hold including those placed on hold less than 15 seconds and those placed on hold more than 15 seconds; the total number of incoming and outgoing telephone calls placed at each of the answering stations; the average time spent on each call at each of the answering stations; the total time during which each of the answering stations has been out of service; and the total number of calls which have been answered by traffic controller 104 using the taped message.

Key telephone set 112, and those at answering stations 118 through 120, are of the prior art type which are compatible with key telephone set interface 102. Each of the sets is connected to, in the preferred embodiment, up to twenty-nine of the incoming lines which form cable 122 and by an RJ-35X cable, such as cable 134, to the associated operator console. Preferably, set 112 is of the type which has thirty keys, illustrated at 150. Of the thirty keys, twenty-nine are for coupling the set to a selected one of the twenty-nine incoming lines forming cable 122 and one key for placing the selected line on hold. When a line is selected by one of the keys 150, the six lines (T, T1, 12, 121, A and A1) forming the selected telephone line are also coupled to cable 134 and thus to operator console 116.

In the embodiment 10, patcher 114, and the patchers at the other answering stations, are connected to the twenty-nine incoming lines which form cable 122, the two outgoing lines of cable 122, a bus, and a line such as bus 132 and line 133 which connect patcher 114 to the operator console 116. Patcher 114 has a twelve-key, key pad 152, a two-digit numeric display 154 and a pair of line busy indicators 156 and 158. The patcher 114 decodes entries made by means of the key pad 152 which select one of the twenty-nine incoming lines and one of the two outgoing lines and bridges the two lines. The patcher 114 displays the selected incoming line by means of display 154 and the status, if busy, of each of the two outgoing lines by means of indicators 156 and 158. Additionally, patcher 114 informs traffic controller 104 of its actions by means of the signals it generates on bus 132.

Operator console 116, which is discussed in detail below, is typical of the operator consoles located at each of the answering stations. Console 116 is connected to bus 130, bus 132 and lines 133 and 134. The console 116 has a two-numeric digit display 170 for identifying a telephone line on which the assigned incoming call may be taken, a three-numeric digit display 172 for identifying the called station number that corresponds to the assigned call, a call-waiting indicator 174, a thirty-two alpha numeric display 176 for displaying an answering message for use in answering the assigned call, a mute switch 178, a station out of service switch 180, a message waiting switch and indicator 182 and 184, respectively, and a special instruction switch and indicator 186 and 188, respectively.

Console 116 monitors the signals generated on bus 130. When addressed by traffic controller 104, console 116 decodes and displays at 170, 172 and 176, signals which indicate the line of cable 122 on which the assigned call may be taken, the corresponding called station number, and a corresponding answering message, respectively. Signals are also decoded and displayed at 184 and 188, which indicate the contents of the corresponding message waiting and special instruction registers, respectively, of traffic controller 104.

Switches 182 and 186 are effective to signal traffic controller 104, by means of signals on bus 130, to alter the state of the message waiting register and the special instruction register, respectively, which correspond to the displayed called station number. Console 116 further responds to the operation of switch 180 to signal the status, in or out of service, of answering station 110.

The hold key of the key telephone set 112 may be employed to place a call on hold. However, the call will automatically be reassigned by traffic controller 104 after fifteen seconds. A hold without reassignment may be achieved by use of mute switch 178. When servicing one call, if another call is waiting, indicator 174 is illuminated. Additionally, console 116 responds to a request by traffic controller 104 and generates a series of very short pulses on line 134, which are coupled by key telephone set 112 to the telephone line of cable 122 to which it is connected.

The status of answering station 110 is displayed by operator console 116. When the station is out of service, displays 170 and 172 are blank. When the station is in service and no calls have been assigned thereto, zeros are displayed at 170 and 172. The operation of mute switch 178 causes decimal points, between the digits of displays 170 and 172, to be lit. Finally, when an outgoing call is being placed, telephone line identification display 170 displays a "99."

Operationally, switching unit 80, at telephone central office 46, monitors the current flowing in telephone lines 60, 66 and the lines which form cable 62. When a telephone set at one of the calling stations, such as set 20 at station 22, goes off-hook bridging the tip-and-ring lines of the respective line (e.g., line 60 in this case), an off-hook current flows therein. When such a current flow is detected by switching unit 80, the unit generates a dial-tone signal on the line and monitors the line for a dialing signal. Switching unit 80 responds to a dialing signal that specifies a telephone line such as line 64 by generating a ringing signal thereon.

Call diverter 30 responds to the ringing signal generated on line 64 and signals an off-hook condition on line 66. After switching unit 80 generates a dial tone signal on line 66, call diverter 30 develops dialing pulses on line 66 so as to dial the preassigned telephone number which specifies a trunk of cable 84, and thus a trunk of cable 124 and a line of cable 122, and generates on line 66 a preassigned indentification signal which identifies the called station. Following the generation of a ringing signal on the specified trunk of cable 84 by switching unit 80 and after detection of the signal by traffic controller 104, the controller signals an off-hook condition on the trunk. This causes switching unit 80 to cease the generation of the ringing signal on the trunk and to bridge line 66 to the trunk so as to couple the identification signal generated on line 66 to the trunk.

Traffic controller 104 decodes the identification signal to obtain a called station number which it transmits to terminal 108 by means of line 128. While monitoring line 128 for a signal indicating a corresponding answering message, controller 104 selects an answering station to process the call. Assuming that station 110 is selected, controller 104 generates signals on bus 130 which indicate the number of the line of cable 122 of the assigned call, the associated called station number, and if received from terminal 108, the associated answering message, all for display on console 116. Additionally, the contents of the associated message waiting and special instruction registers are generated on the bus for display by the console. Finally, the status of key telephone set 112 is monitored by means of the signals which are developed on line 134.

When key telephone set 112 is connected to one of the lines of cable 122, traffic controller 104 senses the change in status of set 112 and instructs operator console 116 to generate a series of short duration pulses on line 134 and thus on the selected line of cable 122. Simultaneously, controller 104 scans the trunks of cables 124 and 126 to detect the requested pulses and to thereby identify the selected line of the lines of cable 122. If traffic controller 104 ascertains that the line on which telephone set 112 is connected is not the one which is designated by operator console 116, the controller updates console 116 by means of signals developed on bus 130 such that the information displayed on the console corresponds to the line to which the set is connected.

When traffic controller 104 determines that key telephone set 112 is connected to the designated line, controller 104 generates the connect-type handshake signal on the associated trunk. Responsive thereto, call diverter 30 ceases transmission of the identification signal, signals an off-hook condition on line 64, and couples audio signals between lines 64 and 66. Finally, when switching unit 80 senses the off-hook signal on line 64, the unit ceases generation of the ringing signal on line 64 and couples signals between line 60 and line 64, and thus, to key telephone set 112 at answering station 110 where an operator can process the call.

Switching unit 80 responds to the dialing of a telephone number which corresponds to line 68 and telephone set 34, after a proper telephone forwarding number for answering bureau 48 has been entered into the set, by generating a brief ringing signal on line 68. Unit 80 thereafter generates dialing pulses corresponding to the last three digits of the telephone forwarding number on a DID trunk of cable 86 specified by the number. Traffic controller 104 counts the dialing pulses to identify the called station, i.e., station 36, selects an answering station to process the call, and, with the help of terminal 108, develops signals on bus 130 which cause the operator console at the selected answering station to display the pertinent information. When controller 104 senses that the key telephone set at the selected station has been connected to the proper line, the controller causes the battery potential developed on the specified trunk to be reversed thereby signalling switching unit 80 to couple audio signals between line 60 and the trunk.

Responsive to a dialing signal on line 60 which specifies telephone line 70 and telephone set 38, switching unit 80 generates a ringing signal on line 70. When detected by call concentrator 82, the concentrator generates on line 90 a signal identifying the ringing line, i.e., line 70, and requesting a ring count. The concentrator simultaneously counts the number of rings generated on line 70. After three rings, or, should a ring count be forthcoming from terminal 128, after the specified number of rings, concentrator 82 scans the trunks of cable 88 to locate an idle trunk upon which it generates a ringing signal.

Upon detecting the ringing signal on the trunk of cable 124 which corresponds to the selected trunk of cable 88, traffic controller 104 generates an off-hook signal on the trunk and monitors the trunk for an identification signal identifying the called station, e.g, station 40. After assigning the call and determining that the key telephone set at the assigned answering station has been connected to the correct line, controller 104 generates a connect-type handshake signal on the trunk. The connect signal causes call concentrator 82 to cease the generation of the indentification signal, to generate an off-hook signal on line 70 requesting switching unit 80 to couple signals between lines 60 and 70, and to couple signals between line 70 and the selected trunk of cable 88 and, thus, to the key telephone set at the selected answering station.

Figure 2:
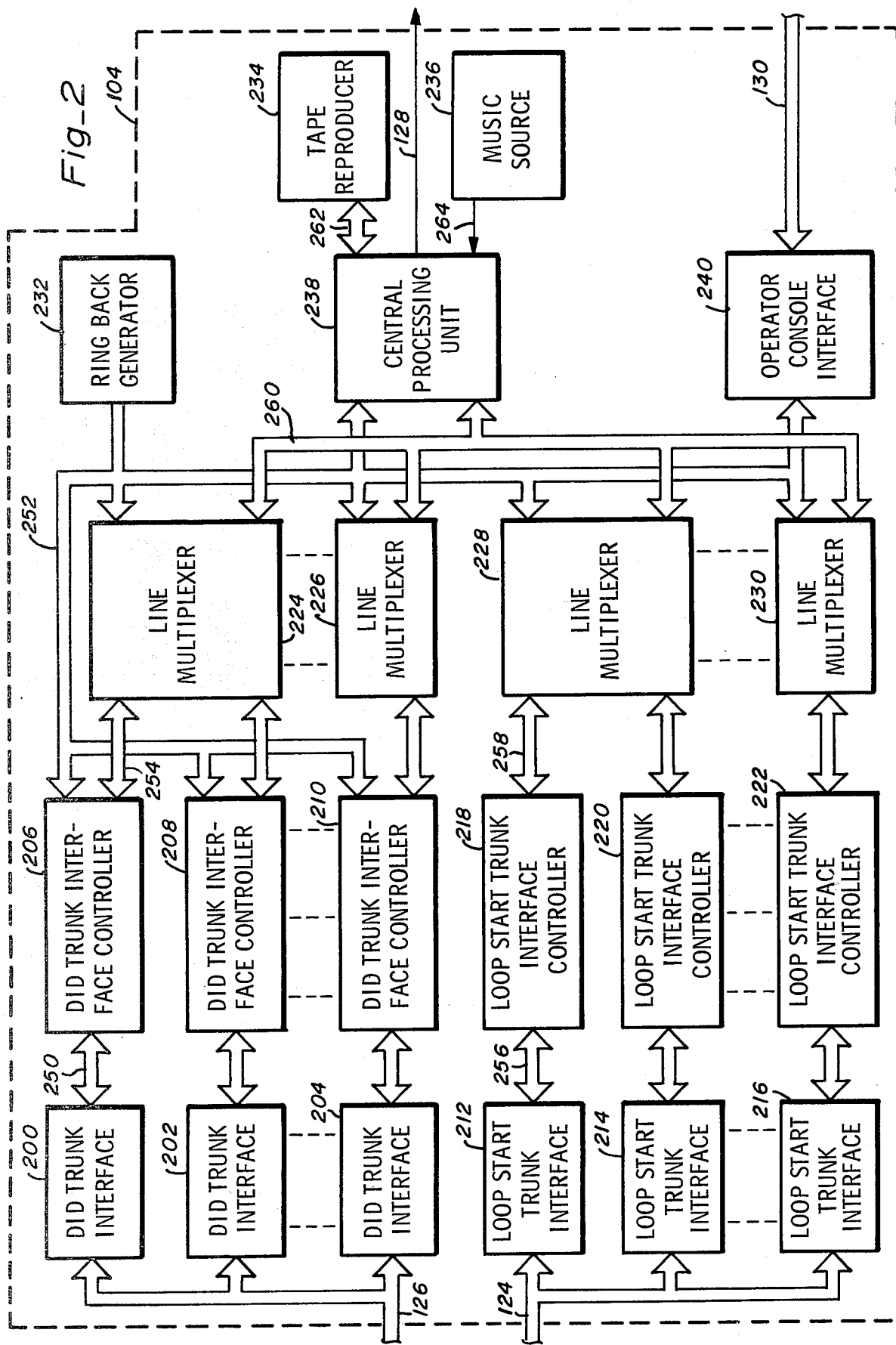
FIG. 2 is a block diagram generally illustrating the principal components of a traffic controller for use in a telephone call diverting and answering system of FIG. 1.

The principal components of traffic controller 104 are illustrated in block form in FIG. 2. The controller 104 includes a number of DID trunk interfaces 200, and 202-204; a number of DID trunk interface controllers 206, 208-218; a number of loop start trunk interface controllers 218, 220-222; a number of line multiplexers 224-226 and 228-230; a ring back generator 232; a tape reproducer 234; a source of music 236; a central processing unit (CPU) 238; and an operator console interface 240.

DID trunk interface 200, which is similar to interfaces 202-204, interfaces up to six trunks of DID cable 126 to a cable 250 and, thus, to DID trunk interface controller 206. Interface 200 provides a battery potential for the trunks of cables 126 and monitors the current flow therein to detect an off-hook signal, i.e., loop closure, at the distal end, in this case at the telephone central office. Additionally, under the control of DID trunk interface controller 206, interface 200 provides battery reversal and selectively couples audio signals to the trunk of cable 126.

Typical of the DID trunk interface controllers is controller 206 which monitors DID trunk interface 200. In addition to being connected to cable 250, controller 206 is connected to central processing unit (CPU) 238 by an address and a bidirectional data bus, illustrated as a bus combined 252; and to line multiplexer 224 by a cable 254. Controller 206 has circuitry for counting the dialing pulses developed on each of the trunks by the telephone central office. Upon being notified by DID trunk interface 200 of a loop closure on one of the DID trunks, controller 206 readies its internal counter for receiving dialing pulses and notifies the CPU by means of line multiplexer 224. When so instructed by the CPU 238 through line multiplexer 224, controller 206 notifies DID trunk interface 200 to seize the trunk. Additionally, controller 206 counts the pulses developed on the trunk to develop digits which are sent to the CPU 238 on bus 252 and, when instructed by the CPU, instructs interface 200 to reverse the battery potential.

Loop start trunk interface 212, like the similar interfaces 214 and 216, provides a means of coupling audio signals to up to six loop start trunks of cable 124.

Loop start trunk interface controller 218 is connected to loop start trunk interface 212 by a cable 256 and to line multiplexer 228 by a cable 258. Circuitry in controller 218, like similar circuitry in controllers 220 through 222, detects ringing signals generated on the trunks of cable 124 which are coupled to the controller by interface 212 and cable 256, and transmits indication of such detection to the CPU 238 by means of line multiplexer 228. In addition, the circuitry of controller 218 bridges one of the trunks so as to conduct an off-hook current flow therethrough or places the trunk on "hold" in response to appropriate commands from multiplexer 228.

Coupling the DID trunk interface controllers 206, 208-210 and the loop start turnk interface controllers 218, 220-222 to the CPU 238 are a number of similar line multiplexers including multiplexer 224. Multiplexer 224 has circuitry coupled to bus 252 to permit the CPU 238 to scan the various lines from the controllers, including the lines of cable 254, to ascertain the status of and to exercise control over the various trunks of cables 124 and 126. Connected to a cable 260, circuitry in multiplexer 224 selectively couples signals from the CPU 238, including the connect-type handshake signal, the disconnect-type handshake signal, music, the auto answer tape signal, and the output of the ring back generator 232, to the various trunks by way of the controllers and interfaces. In addition, multiplexer 224 includes circuitry so as to decode dual tone multi-frequency identification signals generated on the trunks and circuitry so as to detect pulses on the trunks of the type which are used to determine to which line a particular key telephone set is connected.

As previously indicated, in the embodiment 10, traffic controller 104 is designed to interface, at most, a total of twenty-nine trunks of the trunks of cables 124 and 126. Since each DID trunk interface can interface up to six DID trunks and each loop start trunk interface can interface up to six loop start trunks, the number and mix of interfaces is dependent upon the chosen number and mix of loop start and DID trunks. Of course, for each DID trunk interface or loop start interface, one DID trunk interface controller or loop start trunk interface controller, respectively, is required. One line multiplexer, such as multiplexer 224, is capable of interfacing to the CPU 238 up to six controllers of either type.

Ring back generator 232 generates a ringing tone on a line of bus 252 for use on DID trunks. The tone is similar to that which the telephone central office sends to callers while it is generating a ringing signal on the called line. Tape reproducer 234, which is coupled to a cable 262, and music source 236, which is coupled to a line 264, are sources of the automatic answer message and the music used for calls on "hold," respectively.

Central processing unit 238, which is connected to bus 252, cables 260 and 262, RS-232 line 128 and line 264, interrogates the various components of the controller to determine their status and effects control thereover to properly identify and assign incoming calls.

Operator console interface 240, interfaces signals generated on the sixteen-bit address and eight-bit bidirectional data buses, which form bus 252, with six sets of buses which form bus 130. Each of the bus sets includes an eight-bit address bus, an eight-bit unidirectional data bus and a console status and command bus. To control one of the various operator consoles, interface 240 decodes address signals generated by the CPU 238 to direct commands to and receive status information from a selected one of the operator consoles.

Figure 3:
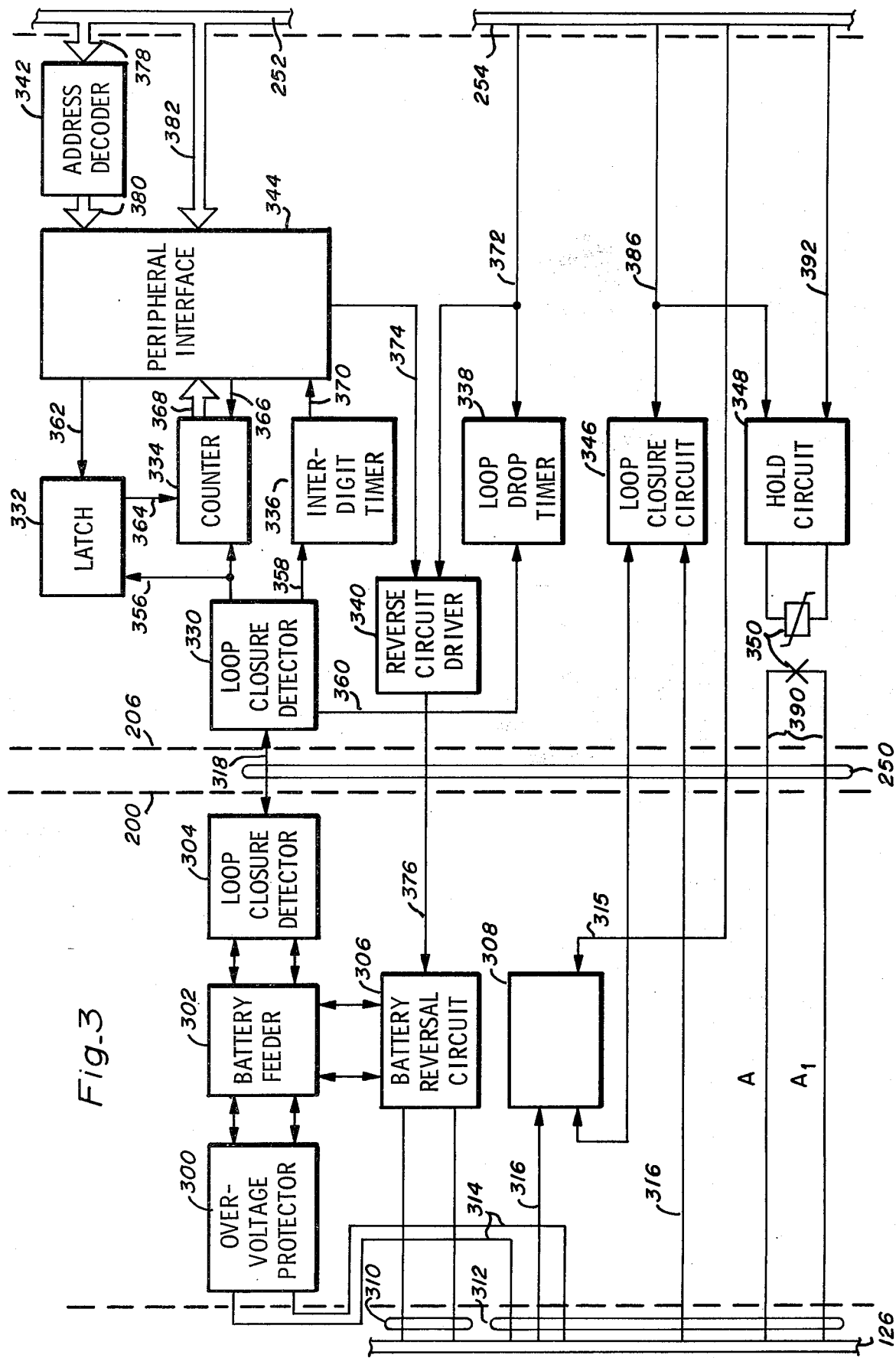
FIG. 3 is a block diagram illustrating one of the six similar circuits which comprise a DID trunk interface and one of the six similar circuits which comprise a DID trunk interface controller of those shown in FIG. 2.

One of the six similar circuits which form DID trunk interface 200 and one of the six similar circuits which form DID trunk interface controller 206 are illustrated in FIG. 3. The illustrated portion of interface 200 includes an over voltage protector 300, a battery feeder 302, a loop closure detector 304, a battery reversal circuit 306 and an audio coupling circuit 308. The lines that form the trunk of cable 126 which is interfaced by this circuit are illustrated separately including a tip and a ring line forming a trunk 310 which is connected to the telephone central office and a number of lines forming a cable 312 which are used by the key telephone unit. Battery voltage is supplied to the trunk by means of a transformer and an optically isolated silicon controlled rectifier bridge circuit. A diode, which is connected across a tip and ring line pair which couples signals into the key telephone unit, illustrated at 314 clips transients developed on the trunk.

Audio signals developed on line 315 are coupled in series with the ring line of a tip and ring line pair, illustrated at 316 returning from the key telephone unit, by audio coupling circuit 308. Circuit 308 includes an audio coupling transformer, an RC circuit for filtering the audio signals, four series-parallel connected diodes to limit the level of the audio signals and a pair of diodes and resistors as illustrated in connection with loop start trunk interface 212, to insure that sufficient loop current flows through the key telephone unit.

Loop closure detector 304 includes a light emitting diode, a phototransistor and an amplifier to generate a signal on a line 318 when a loop current flow is detected.

The illustrated portion of DID trunk interface controller 206 includes a loop closure detector 330, a latch 332, a counter 334, a pair of timers 336 and 338, a reversing circuit driver 340, an address decoder 342, a peripheral interface 344, a loop closure circuit 346, a hold circuit 348 and a relay 350. The loop closure detector 330 includes circuitry for responding to the loop closure detected signal developed on line 318 and to generate a filtered and conditioned detected signal on three lines 356, 358 and 360. Latch 332 and counter 334 count the interruptions, or pulses, in the loop current generated by the telephone central office when it dials the last three digits of the telephone forwarding number, to identify the called station. Latch 332 responds to a reset signal generated by peripheral interface 344 on a line 362 and the pulses generated on line 356 by detector 330 to properly enable counter 334 by means of a signal developed on a line 364. Counter 334, after being reset by a signal developed on a line 366, counts the pulses which form each of the digits developed on line 356 to develop a sum signal on a four-bit bus 368.

Both interdigit time 336 and loop drop timer 338 employ RC timing networks in Schmitt trigger circuits. Interdigit timer 336 differentiates the period between dialed digits from that which separates pulses of a digit and is operative to develop a read signal on a line 370 following the dialing of each digit. By filtering the loop closure detected signal to remove pulses thereon, such as the dialing pulses, loop drop timer 338 develops, on a line 372 of cable 254, a signal which advises the CPU 238, by means of its respective line multiplexer, of the activity of the respective trunk.

Reverse circuit driver 340 includes a flip-flop circuit that is reset by the filtered loop closure signal developed on line 372 and set by a signal developed by peripheral interface 344 on a line 374. The driver 340 develops a signal on a line 376 suitable for driving battery reversal circuit 306.

Address decoder 342 and peripheral interface 344 decode signals generated by the CPU to develop command signals for the controller and to return status information. Address decoder 342 compares signals generated on the sixteen-bit address portion of bus 252, a bus 378, with addresses preassigned for the particular interface controller. When a match is obtained, decoder 342 generates an enabling signal on a bus 380. The enabling signal causes peripheral interface 344 to transfer the signals representing each of the dialed digits which are developed on bus 368 or the status read signal developed on line 370 to an eight-bit data bus portion 382 of the bus 252. Alternatively, the enabling signal causes the interface 344 to generate the reset signal on line 362 or line 366 or the set signal on line 374 responsive to the signals developed by the CPU 238 on bus 382. A relay and a relay driver of the loop closure circuit 346 is responsive to a seize command developed on a line 386 and couples the tip and ring lines 316 through coupling circuit 308.

Hold circuit 348 includes a logic and a relay driver adapted to respond to the transition of the seize command developed on line 386 to develop a relay actuating signal to cause relay 350 to interconnect the A and A1 lines illustrated at 390, of cable 126. Hold circuit 348 is initialized responsive to signals generated on a line 392.

Figure 4:
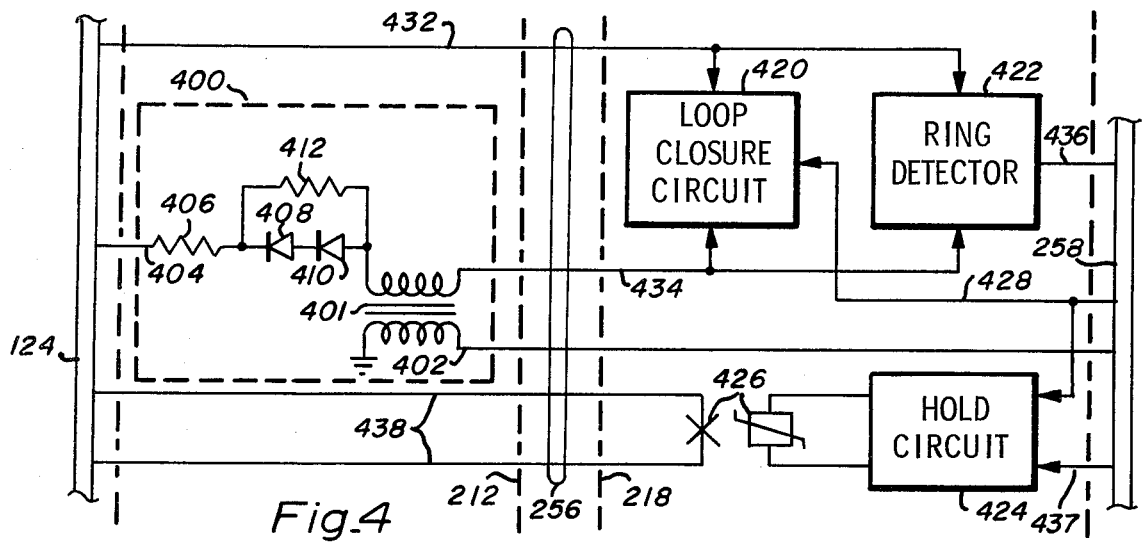
FIG. 4 is a block diagram illustrating one of the six similar circuits which comprise a loop start trunk interface and one of the six similar circuits which comprise a loop start trunk interface controller of those shown in FIG. 2.

One of the six similar circuits which form loop start trunk interface 212 and one of the six similar circuits which form loop start trunk interface controller 218 are illustrated in FIG. 4. The illustrated portion of interface 212 includes an audio coupling circuit 400 which is similar to the audio coupling circuit 308. The circuit 400, which for clarity is shown in simplified form, includes a transformer 401 having a winding connected between circuit ground and a line 402 for receiving audio signals developed thereon and another winding connected in series with a ring line 404 of the trunk of cable 124 which circuit 400 interfaces, for coupling the audio signal to the trunk 124. Also connected in series with the ring line 404 is a resistor 406 and a pair of diodes 408 and 410 shunted by a resistor 412. Since the key telephone unit is essentially connected in parallel with the interfaces and the controllers, circuit 400 insures that the unit receives its required loop current by providing a suitable nonlinear characteristic thereto.

The illustrated portion of loop start trunk interface controller 218 includes a loop closure circuit 420, a ring detector 422, a hold circuit 424, and a relay 426. Loop closure circuit 420 is similar to circuit 346 and responds to a seize command developed on a line 428. Loop closure circuit 420 interconnects the tip line, a line 432, and the ring line at a point after audio coupling circuit 400, illustrated at 434, through circuit 400.

Ring detector 422 includes a light emitting diode (LED) which is coupled between tip line 432, line 434 and the ring line at a point after audio coupling circuit 400 by means of a series combination of a resistor, a capacitor and a zener diode. Detector 422 also includes a phototransistor and an amplifier responsive to the LED and operative to develop a ring detected signal on a line 436 of the cable 258.

Another circuit of loop start trunk interface controller 218 which has a comparable counterpart in DID trunk interface controller 206 is hold circuit 424. Like circuit 348, hold circuit 424 is reset by an initialization signal developed on a line 437. Responsive to the transition of the cease signal developed on line 428, hold circuit 424 causes relay 426 to interconnect the A and A1 lines which are a pair of lines 438 of the trunk which this circuit of loop start trunk interface controller 218 controls. Since both types of controllers are driven by one type of line multiplexer, the signals developed on lines 436, 428, 402 and 437 of cable 258 are comparable with those developed on lines 372, 386, 315 and 392 of cable 254.

Figure 5:
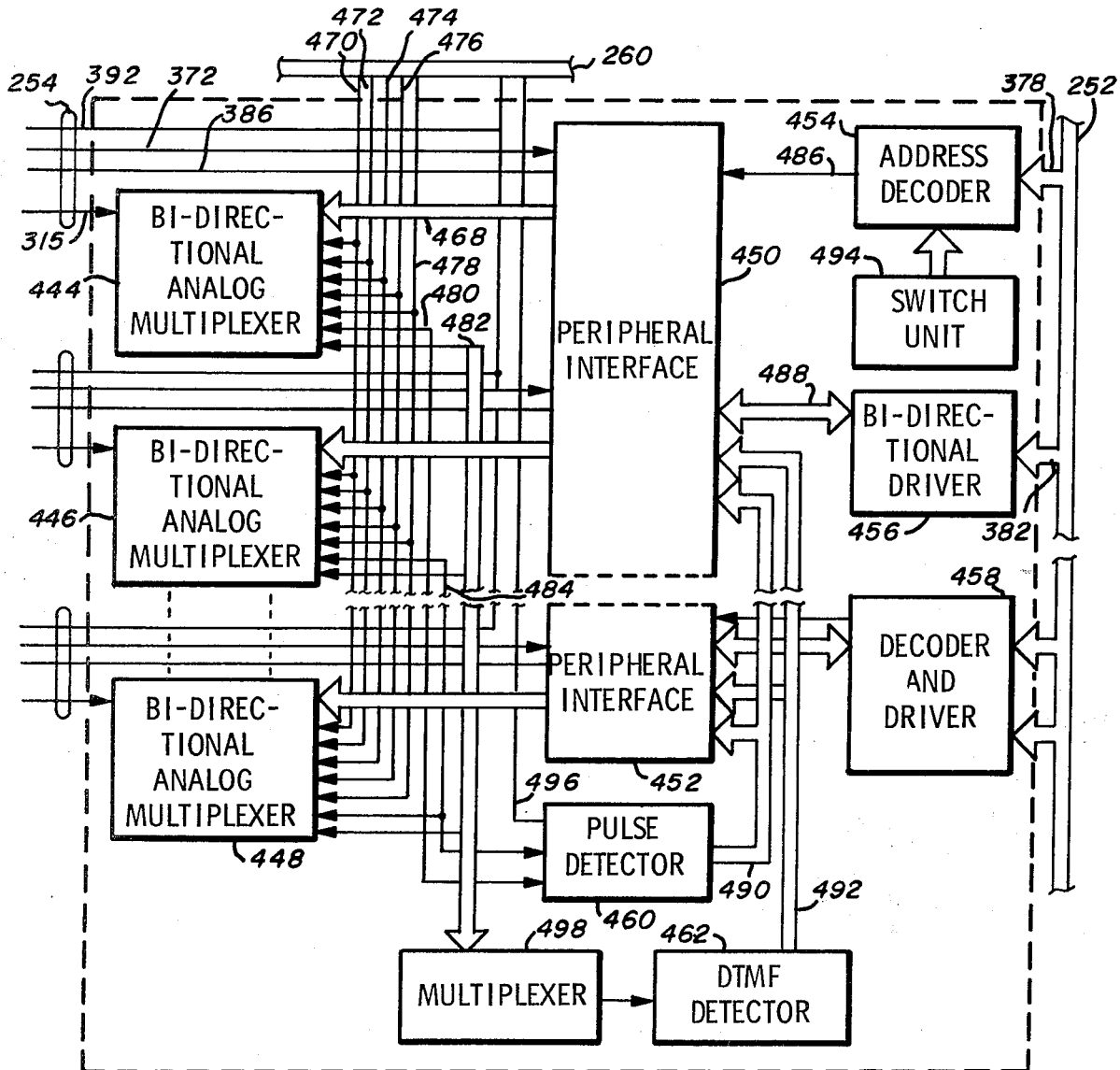
FIG. 5 is a block diagram illustrating one of the line multiplexers shown in FIG. 2.

Illustrated in FIG. 5 is a representative one of the line multiplexers, multiplexer 206. Multiplexer 206 includes six bi-directional analog multiplexers 444 and 446 through 448, each for selectively coupling a variety of audio signals to a respective interface controller. Multiplexer 206 further includes two peripheral interfaces 450 and 452 each driving three of the analog multiplexers 444, 446 through 448, and communicating with three of the interface controllers. An address decoder 454 and a bi-directional bus driver 456 and connected to the interface 450. A similar decoder and driver 458 is connected to interface 452. A pulse detector 460 and a dual tone multi-frequency detector 462 are connected to the peripheral interfaces 450 and 452.

The analog multiplexers 444, which in the embodiment 10 employs a pair of devices of the type which are designated 4051, responds to address, enable, and a read/write signal develped by the interface 450 on a bus 468. Multiplexer 444 selectively couples the connect-type handshake signal, the disconnect-type handshake signal, music, the auto answer message or the ring back signal developed on a line 470, a line 472, a line 474, a line 476 or a line 478 of cable 260, respectively, to line 315. The multiplexer 444 is further operative to selectively couple audio signals from the line 315 to the odd input of pulse detector 460 by a line 480 or to DTMF detector 462 by a cable 482. It should be noted that the first multiplexer 444 like the other odd numbered multiplexers are connected to the odd input of pulse detector 460 by the line 480, while the even numbered multiplexers are coupled to the even input of detector 460 by a line 484.

Peripheral interface 450 is additionally connected to address decoder 454 by a bus 486. Interface 450 is further connected to the bi-directional driver 456 by a bus 488 and to pulse detector 460 by a bus 490 and to the DTMF detector 462 by a bus 492. In operation when a range of address signals developed on the address bus porion 378 of the bus 252 compare with those signals preselected for the line multiplexer 206 by a switch unit 494, the address decoder 454 generates enabling signals on the bus 486. Responsive thereto, peripheral interface 450 generates from the signals developed on bus 488 a seize command on line 386 or the analog multiplexer driving signals on bus 468. The interface 450 is also responsive to the enabling signals to couple the filtered loop closure signal developed on line 372, the output of pulse detector 460, or the output of DTMF detector 462 to bus 488. The signal on bus 488 is then coupled to data bus 382 by means of the bi-directional driver 456. In the embodiment 10, interface 450 includes an interface device such as designated 8255.

Pulse detector 460 includes a pair of detectors of which one is to monitor odd line 480 and the other to monitor even line 484. During a timing window delineated by a signal developed by the CPU 238 on a line 496, the pulse detector 460 monitors the lines 480 and 484. Responsive to line identifying pulses on either line 480 or 484, the detector 460 generates detected signals on bus 490.

In the embodiment 10, the DTMF detector 462 includes a pair of active filters each driving a respective amplifiershaper which drive a tone decoder device such as that which is designated 5102. Detector 462 is selectively coupled to one of the analog multiplexers by a multiplexer 498. When so coupled, detector 462 decodes DTMF called station identification signals to develop on a bus 492 signals which identify the called station.

A block diagram further illustrating ringback generator 232 is shown in FIG. 6. Generator 232 includes a low frequency oscillator 500, a ring-tone generator 502, and an amplifier 504. The oscillator 500 generates a square wave signal on a line 506. The signal has a two second "on" time and a four second "off" time for gating generator 502 "on" and "off". Generator 502, which is controlled thereby, has two oscillators. One oscillator is for generating a 350 hertz signal and the other is for generating a 440 hertz signal. The signals are combined to develop on a line 508 a gated dual tone signal. The dual tone signal is amplified by the amplifier 504 to develop the ring tone signal for the line of cable 252.

FIG. 7 illustrates a block diagram of the central processing unit 238. The CPU 238 includes a clock 520, a microprocessor 522, a latch 524, a read only memory (ROM) 526, a random access memory (RAM) 528, a pair of buffers 530 and 532, a combined read only and random access memory 534, an asynchronous interface 536, a peripheral interface 538 and a tone generator 540. The clock 520 includes a free-running oscillator circuit for developing pulses at a sixty hertz rate on a line 550 connected to the microprocessor 522. The pulses are coupled to the restart 7.5 input terminal of the microprocessor 522 to facilitate processing tasks which must be done on a regular basis.

In the embodiment 10, microprocessor 522 employs a device such as that which is designated 8085 by the Intel Corporation. Microprocessor 522 is connected to a sixteen-bit address bus 552 and to an eight-bit bi-directional data bus 554. Since the microprocessor 522 develops eight of the sixteen bits of address information on the data bus, a latch such as that which is designated 8212 by the Intel Corporation is employed to respond to an address latch enable signal developed by microprocessor 522 on a line 556, and to develop from the signals generated at that time on data bus 554 the additional address signals.

Permanent and temporary program and data storage are provided by ROM 526 and RAM 528, respectively. Preferably, four devices such as those which are designated 2114 are employed to provide 8k bytes (8192 by 8 bits) of ROM and 2k bytes of RAM, respectively. Additional gates and decoders, such as those designated 74LS138, are used to decode the address signals to uniquely designate the particular memory device.

Address signals on bus 552 are coupled to bus 378 by amplifiers in the buffer 530, and data signals are coupled between the two data buses 554 and 382 by the bi-directional buffer 532. Devices such as those designated 8089 and 8216 are employed for buffers 530 and 532, respectively.

An additional 16k bytes of ROM and 2k bytes of RAM are provided by read only and random access memory 534 which is connected between buses 378 and 382. Like memories 526 and 528, devices such as those designated 2716 and 2714 are employed.

Connected between the data bus 554 and line 128, asynchronous interface 536 provides conversion between the parallel format employed by the microprocessor on the data bus and the RS-232 serial format required to drive line 128.

Control over the tape reproducer and generation of the timing window is provided by the peripheral interface 538. By latching signals developed on data bus 554, interface 538 generates a reproducer controlling signal on a line 556 and a timing signal on line 496. Interface 538 also permits the microprocessor to read the state of ten user adjustable switches in a switch unit 558, which is connected to interface 538 by means of a bus 560, permitting options to be set such as whether the auto answer mode is used and whether calls are assigned democratically or by priority.

In the preferred embodiment 10, interfaces 536 and 538 employ logic including a device such as that which is designated 74LS138 for decoding unique address signals developed on bus 552 to develop interface enabling signals. The interfaces further include a pair of devices such as those which are designated 8251 and 8255, respectively, by the Intel Corporation, buffers for amplifying the signals to be developed on line 128 and a transistor to amplify the signal to be developed on line 556.

Tone generator 540 is a dual-tone-multi-frequency generator, as is known in the art, for generating connect and disconnect type handshake signals on lines 470 and 472. Coupling music signals between lines 264 and 474, an amplifier 562 conditions the level of the signals.

Figure 8:
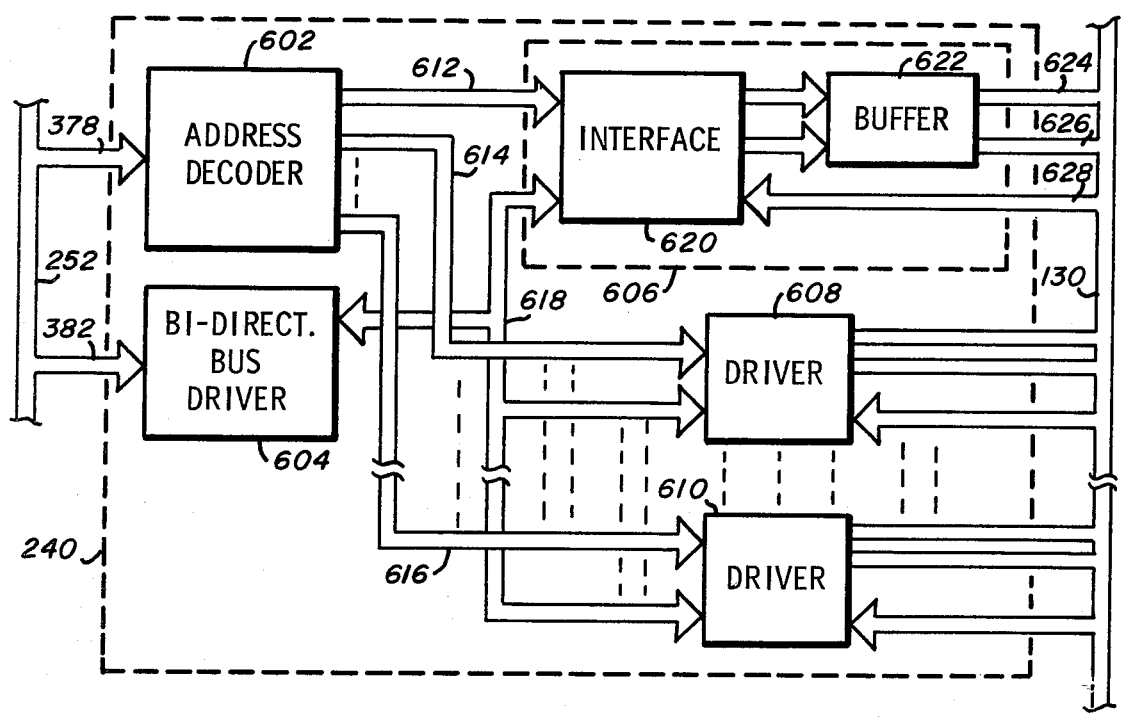
FIG. 8 is a block diagram illustrating the operator console interface shown in FIG. 2.

Operator console interface 240 is illustrated in greater detail in FIG. 8. Interface 240 includes an address decoder 602, a bi-directional bus driver 604, an operator console driver 606, and five operator console drivers 608 through 610. Decoder 602 includes a number of gates and an address decoder device, such as that designated 74LS138. Decoder 602 is adapted to decode address signals generated on the address portion of bus 252 and to generate driver enabling signals on an internal bus 612 and five buses 614 through 616.

Driver 604 includes a pair of devices, such as those designated 8216. Driver 604 is adapted to couple signals between the data portion 382 of bus 252 and an internal data bus 618.

Driver 606, like the similar drivers 608 through 610, includes an interface 620 employing a device, such as that which is designated 8255, and a buffer 622 employing a number of devices such as those which are designated 4069. When enabled by signals developed on bus 612, interface 620 with buffer 622 couples signals generated on bus 618 to an eight bit address bus 624 or an eight bit data bus 626. Alternatively, interface 620 couples control signals developed on an eight bit control bus 628 to data bus 618. The twelve lines forming buses 624, 626 and 628, which form part of bus 130, are used to drive one of the operator consoles, e.g., console 116. Those buses of bus 130 which are connected to the other devices each drive a respective one of the other operator consoles.

Typical of the operator consoles, console 116 is illustrated in FIG. 9. A display portion of the console is shown to include a counter 702, a clock 704, a memory 706, a character memory 708, and an interface and display 710. Preset by address signals generated on bus 624, the counter 702 is incremented by pulses generated by clock 704 on a line 712 to generate sequential memory addressing signals on a bus 714. Counter 704 is also responsive to a particular address signal generated on bus 624 and operative to generate a timing signal on a line 716. Memory 706 is a (128×8) bit RAM which is used to store line identifying numbers and answering message characters. When driven by an addressing signal generated on bus 714, memory 706 generates on a bus 718 a signal representing the contents of the addressed memory location.

ROM 708 translates character signals generated on bus 718 to signals suitable for driving a fourteen segment display on a bus 720. Interface and display 710 contains interfacing circuitry and fourteen segment display devices for developing a two-digit and a three-digit line identifying display and a thirty-two character alpha numeric answering message display.

Operationally, memory addresses are developed on the bus 624 coincident with corresponding line identifying numbers or answering message characters on bus 626 for storage in memory 706. Thereafter, counter 702, driven by clock 704, sequentially addresses memory 706 causing each of the numbers and the characters to be sequentially developed on bus 718. The numbers or characters are converted to fourteen segment format to be used with the address signals to refresh interface and display 710. The state of the various front panel switches, which, except for the mute switch, are illustrated at 730, are encoded by an encoder 732 to drive five of the eight lines of bus 628.

A portion of the operator console 116 which interfaces a corresponding key telephone set is shown to include a voltage detector 740, a current detector 742, a status register 744, a pulse generator 746, a switch 748, and a pair of relays 750 and 752 and associated drivers 754 and 756.

The status of the associate key telephone set is determined by monitoring the current flow between the tip and ring lines and the potential developed between the A and the A1 lines. When the key telephone unit is connected to a line and goes off-hook, an "off-hook" current flows between the tip and ring lines and an A to A1 potential is developed. Should the hold key of the key telephone set be momentarily depressed, the A to A1 potential will momentarily drop and the key telephone unit will place the line, to which the set is connected, on hold.

Voltage detector 740 has voltage comparators for sensing the potential developed between the A and the A1 leads (a line 760 and a line 762 of cable 134) and for developing a status signal on a line 764. Current detector 742 has a light emitting diode connected between the T and T1 lines (a line 766 and a line 768) of cable 134 for sensing a current flow therebetween and a phototransistor and an amplifier for generating a status signal on a line 780. Status register 744 has logic which responds to the status signals generated on lines 764 and 780 and a reset signal developed on a line 781 of bus 628. The register 744 generates signals on a line 782 of bus 628 and on a line 784 which denote an off-hook state.

Register 744 also generates a signal on a line 786 of bus 628, which denotes a hold state.

Referring to pulse generator 746 and switch 748, when an off-hook state is detected, status register 744 generates a signal on line 784 causing the closure of relay 750 to complete a path between T1 line 768 and an R1 line through a diode 788 and a zener diode 790. Relay 752 is normally closed providing, with a parallel connected resistor 792, a current path between R1 line 786 and a R line 794.

Pulse generator 746 includes circuitry adapted to respond to a timing signal developed on line 716 and generates, on a line 796, a series of narrow pulses. Switch 748 includes a transistor so that when driven by the pulses generated on line 796, it shorts diode 788 and 790 thereby coupling the pulses onto the line to which the associated key telephone set is connected. Relay 750 protects the switch 748 by opening when the key telephone set is not off-hook.

Operation of a mute switch 796 causes the state of a latch 798 to be changed. When in a mute state, latch 798, by means of relay driver 756, causes relay 752 to break the connection between the R1 line 786 and the R line 794. In this state, only a small current flows through resistor 792. The reduced current flow reduces the efficiency of the carbon microphone reducing noise coupled to the line while permitting the operator to monitor the line.

Patcher 114 is illustrated in FIG. 10. The patcher includes a (29×2) reed relay matrix switch 802, a pair of switched gain amplifiers 804 and 806, a twelve-key keyboard 808, a controller 810, a pair of relays 812 and 814 and a dual dial tone detector 816. Switch 802 is responsive to signals generated on a bus 820 and operative to couple any one of the incoming lines of cables 122 to a transformer 822 which is coupled by amplifier 804, a transformer 824 and relay 814 to one of the two outgoing lines of cable 122. Responsive to the signals on bus 820, the switch 802 is also operative to couple another incoming line of cable 122 to a transformer 826 which is coupled by amplifier 806, a transformer 828 and relay 812 to the other outgoing line of cable 122.

Keyboard 808, which is a standard twelve-key keyboard or keypad, is used to enter commands into controller 810. Responsive to such commands, the controller 810 is operative to generate the signals on bus 820 causing one or two of the incoming lines to be connected to one or both of the outgoing lines. The controller 810 also causes the closure, as appropriate, of relay 812 and/or relay 814. Dial tone detector 816 contains circuitry for detecting a dial tone signal generated on either line. Responsive to such a tone, detector 816 is operative to generate a signal on a line 830 or a line 832, as appropriate, to reset controller 810 causing the disconnection of the bridge between the respective incoming and outgoing lines.

In FIG. 11, telephone call concentrator 82 is shown. Concentrator 82 includes a number of ring detector and switcher units, illustrated as a unit 902 and units 904 through 906; and a pair of controllers 980 and 910. In the preferred embodiment, twenty-four similar ring detector and switching units are employed with each connected to thirty-two incoming telephone lines. As illustrated, line 70 and thirty-one lines of cable 74 are connected to unit 902 and the remaining 736 lines of cable 74, if used, are connected to units 904 through 906. Also connected to each of the units and to controllers 908 and 910 are a sixteen-line trunk 912, a sixteen-bit address bus 914, and an eight-bit bi-directional data bus 916. Units 902 and 904 through 906 monitor line 70 and the lines forming cable 74 for telephone calls and, under the direction of controller 908 or alternatively controller 910, couple calls on these lines to idle ones of the trunks forming cable 912.

Additionally, controllers 908 and 910 are connected to RS-232 line 90 and to the sixteen trunks forming cable 88. In the preferred embodiment, the two controllers 908 and 910 are similar. Controller 908 provides the control function and controller 910 provides back-up capability. Normally, controller 908, in addition to controlling units 902 and 904 through 906, runs periodic self-diagnostics, and controller 910 monitors the operation of controller 908. Should either indicate that controller 908 is not functioning properly, controller 910 assumes control.

Figure 12:
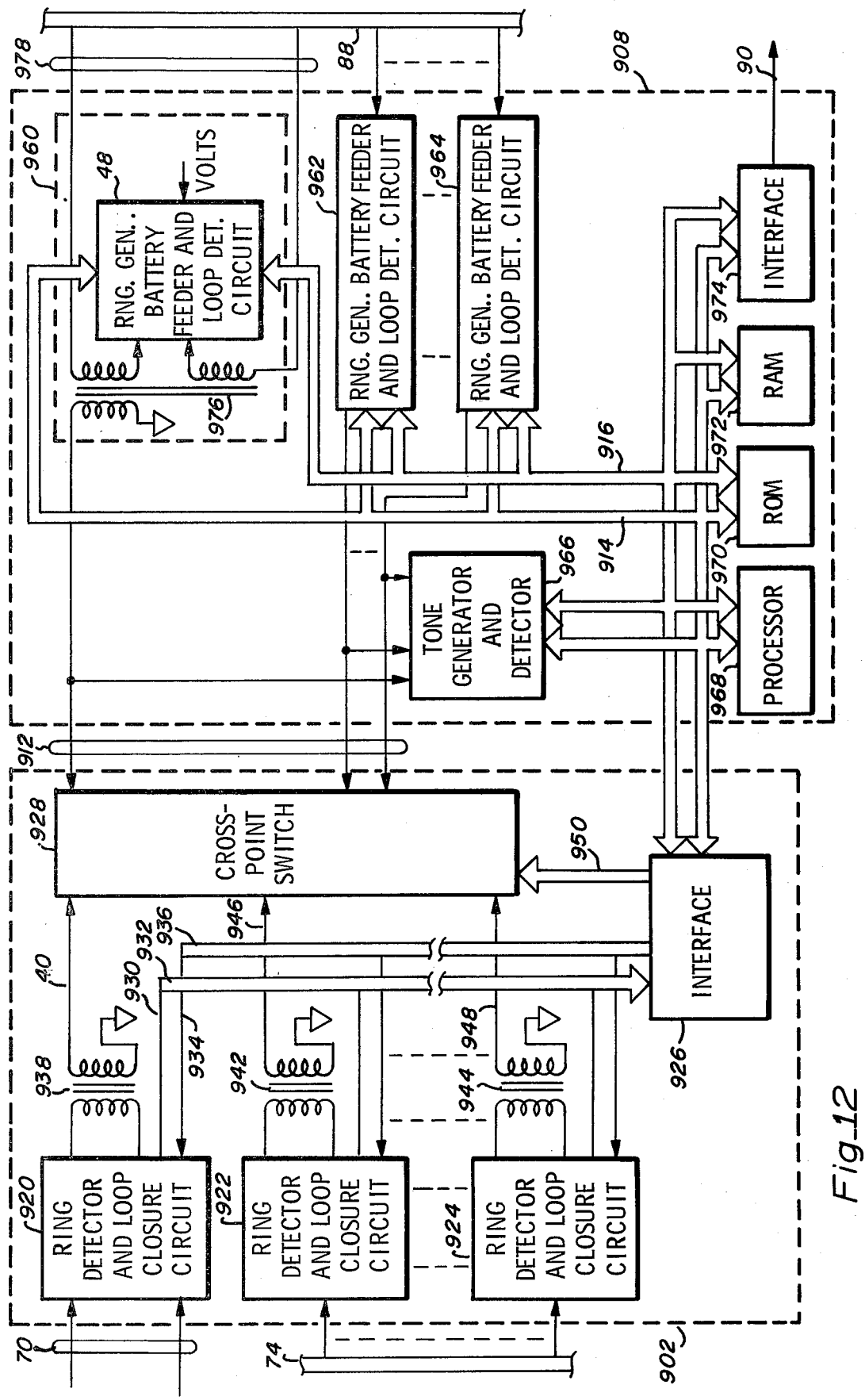
FIG. 12 is a block diagram illustrating one of the ring detector and switching units and one of the controllers shown in FIG. 11.

A block diagram further illustrating ring detector and switcher unit 902 and controller 908 is shown in FIG. 12. Unit 902 includes thirty-two ring detector and loop closure circuits, including a circuit 920 and thirty-one circuits 922 through 924, an interface 926 and a (32×16) cross-point switch 928. Circuit 920 includes a ring detector circuit having a light emitting diode connected in series with a zener diode, a resistor, and a capacitor across the tip and ring lines of line 70. The LED drives an amplifier driving phototransistor to generate, on a line 930 of a cable 932, a ring detected signal. Circuit 920 also includes a relay. When driven by a signal generated on a line 934 of cable 936, the relay couples the tip and ring lines of line 70 to a transformer 938 that is connected to switch 928 by a line 940. Similar circuits in ring detector and loop closure circuits 922 through 924 respond to ringing signals on the various lines of cable 74 and generate ring detected signals on corresponding lines of cable 932. They also respond to signals on the various lines of cable 936 and bridge calls on corresponding lines of cable 74 to switch 928 by means of corresponding ones of thirty-one transformers, designated 942 through 944, and corresponding ones of thirty-one lines, designated 946 through 948.

Interface 926 includes address decoding and buffering circuitry which responds to various address signals generated on bus 914 and couples ring detected signals from the corresponding lines of cable 932 to data bus 916. The interface further responds to other address signals on bus 914 and couples signals generated on bus 916 to corresponding lines of cable 936 or to lines of a bus 950.

Each of lines 940 and 946 through 948 are selectively coupled to each of the lines of cable 912 under control of signals generated on a bus 950 by means of cross-point switch 928. In the preferred embodiment, switch 928 is comprised of a number of devices of the type which are designated CD22100E.

Controller 908 includes sixteen combination ring generator, battery feeder and loop detector circuits designated 960, and 962 through 964; a combination tone generator and detector 966; a processor 968; a read only memory 970; a RAM 972; and an interface 974. Like the similar circuits 964 through 968, circuit 962 has a transformer 976 and other components for coupling a battery potential to the tip and ring lines of a trunk 978 of cable 88. Circuit 960 also has components under the control of signals generated on buses 914 and 916 for developing a ringing signal on trunk 978 and an LED, phototransistor and amplifier for detecting an off-hook current flow on trunk 978.

Four similar dual tone multi-frequency generators, for developing calling line identifying signals, and four similar dual tone multi-frequency detectors, for detecting connect signals, are included in tone generator and detector 966. Under the control of the signals generated on buses 914 and 916, any of the output of the tone generators may be connected to any of the lines of cable 912, or any of the lines of the cable may be connected to any of the inputs of the detectors and the status of the detectors determined by signals generated on bus 916. In the preferred embodiment, the generators each employ integrated circuit tone generators, and the detectors each employ a pair of active filters to separate the tones and a pair of diode detectors, a pair of RC filters and a gating circuit to generate a tone detected signal.

In the preferred embodiment, processor 968 employs a device, such as that which is designated 8085 by the Intel Corporation, which with a latching device, generates addressing signals on the sixteen-bit address bus 914 and both generates and responds to signals generated on the eight-bit bi-directional data bus 916.

Connected between buses 914 and 916 are ROM 970 and RAM 972. In addition to address decoding circuitry, the ROM 970 includes devices such as those which are designated 2716 and the RAM 972 includes devices such as those which are designated 2114.

Also connected between buses 914 and 916 is interface 974. Beside address decoding circuitry and clocking circuitry, interface 974 includes a device such as that which is designated 8251 by the Intel Corporation.

It is contemplated that after having read the preceding disclosure certain alterations and modifications of the present invention will no doubt become apparent to those skilled in the art. It is therefore intended that the following claims be interpreted to cover all such alterations and modifications as fall within the true spirit and scope of the invention.

What is claimed is:

1. An apparatus for coupling calls on a first plurality of lines to a second plurality of lines to each of which each of a third plurality of telephone sets may be connected, the apparatus comprising in combination:

a telephone call concentrator including, first line interface means for connection to each of said first plurality of lines, said first line interface means having first line ringing signal detector means responsive to a ringing signal generator on an active one of said first lines and operative to generate a ringing detected signal, second line interface means for connection to each of said second plurality of lines, said second line interface means having ringing signal generator means responsive to a ring command signal designating a one of said second plurality of lines and operative to generate a ringing signal thereon, off-hook detector means responsive to an off-hook signal generated on said designated line and operative to generate an off-hook line identifying signal, calling line identifying signal generator means responsive to an identify command signal and operative to develop an active line identifying signal on said designated line, and connect signal detector means responsive to a connect signal developed on said designated line and operative to generate a connect signal detected signal and bridge means for connection to each of said first and said second plurality of lines, said bridge means being responsive to a bridge command signal and operative to bridge said active line to said designated line, said concentrator being responsive to said ringing detected signal and operative to select an idle one of said second plurality of lines and to generate said ring command signal, whereby said ringing signal is generated on said selected line, said concentrator being further responsive to said off-hook line identifying signal and operative, when the line identified by said off-hook line identifying signal and said selected line are the same, to generate said identify command signal, and responsive to said connect signal detected signal and operative to generate said bridge command;

a plurality of operator consoles equal in number to said sets, each set console including, set interface means for coupling to an associated one of said plurality of sets, said set interface means having set status detecting means responsive to the tip to ring current conducted by said associated set and operative to generate a set status signal and annunciator means responsive to a display signal and operative to designate a line; and controller means coupled to each of said operator consoles, said controller means including controller line interface means for coupling to each of said second plurality of lines, said controller line interface means having second line ringing signal detector means responsive to said ringing signal generated on said selected line and operative to generate a selected line identifying signal, off-hook signal generator means responsive to an off-hook command signal and operative to generate said off-hook signal on said selected line, and active line identifying signal detector means for receiving said active line identifying signal, said controller means being responsive to said selected line identifying signal and operative to generate said off-hook command signal, responsive to said active line identifying signal detected by said active line identifying signal detector means and each of said set status signals and operative to select an idle one of said consoles and to generate said display signal, whereby said selected line and said active line are designated at said selected console.

2. An apparatus as recited in claim 1 wherein each of said set interface means further has line identifier means responsive to a change in the state of said status signal generated when said associated set is connected to an off-hook one of said second plurality of lines and operative to develop a line marking signal thereon;

said controller line interface means further having line marking signal detecting means responsive to each of said line marking signals and operative to generate a marked line identifying signal and connect signal generator means responsive to a connect command signal and operative to develop said connect signal on said selected line; and said controller means being further responsive to said marked line identifying signal and operative, when said off-hook line and said selected line are the same and when said line marking signal is developed by said selected console, to generate said connect command signal.

3. An apparatus as recited in claim 2 wherein said controller means is further responsive to said marked line identifying signal and operative, when said off-hook line and said selected line are the same and when said line marking signal is developed by another console than said selected console, to generate said display signal whereby said selected line and said active line are designated at said other console and to generate said connect command signal.

4. An apparatus as recited in claim 2 wherein said first plurality of lines contains at least twice as many members as said second plurality of lines.

5. An apparatus as recited in claim 2 wherein
said concentrator is further responsive to said ringing detected signal and operative to count the number of rings of said ringing signal generated on said active line; and
said concentrator is operative to select said idle line and to generate said ring command signal only after having counted a predetermined number of rings.

6. An apparatus as recited in claim 2 wherein
said controller line interface means further includes dialing signal detector means responsive to a dialing signal generated on a dialing one of said second plurality of lines and operative to generate a dialing line identifying signal and a dialed number signal and battery reverser means responsive to a reverse command and operative to generate a battery reversal signal on said dialing line identifying signal, said dialed number signal and each of said set status signals and operative to select said idle console and to generate said display signal, whereby said dialing line and a line identified by said dialed number signal are designated at said idle console, and responsive to said marked line identifying signal and operative, when said off-hook line and said dialing line are the same and when said line marking signal is developed by said selected console, to generate said reverse command signal.

7. An apparatus for assigning calls on a first plurality of telephone lines to a plurality of telephone sets each of which may be connected to each of the first plurality of lines, the apparatus comprising in combination:
a plurality of operator consoles equal in number to said sets, each said operator console including set interface means for coupling to an associated one of said plurality of sets, said interface means having set status detector means responsive to the tip to ring current conducted by said associated set and operative to generate a status signal and line identifier means responsive to a change in the state of said status signal generated when said associated set is connected to an off-hook one of said first lines and operative to develop a line identifying signal thereon and annunciator means responsive to a display signal and operative to designate a line; and
controller means coupled to each of said operator consoles, said controller means including line interface means for coupling to each of said first lines, said line interface means having dialing detector means responsive to a dialing signal generated on a signaling one of said first lines and operative to generate a signaling line identifying signal and a dialed number signal, line identifying signal detector means responsive to each of said line identifying signals and operative to generate an off-hook line identifying signal, and battery reverser means responsive to a connect line identifying signal and operative to generate a battery reversal signal on the one of said first lines specified by said connect line identifying signal, said controller means being responsive to said signaling line identifying signal, said dialed number signal and each of said status signals and operative to select an idle one of said consoles and to generate said display signal, whereby said signaling line and a line identified by said dialing signal are designated at said idle console, and responsive to each of said off-hook line identifying signals and operative, when said off-hook line and said signaling line are the same and when said line identifying signal is developed by said selected console, to generate said connect line identifying signal, whereby said battery reversal signal is generated on said signaling line.

8. An apparatus as recited in claim 7 wherein
said controller means is further responsive to each of said off-hook line identifying signals and operative, when said off-hook line and said signaling line are the same and when said line identifying signal is developed by another console than said selected console, to generate said display signal whereby said signaling line and said line identified by said dialing signal are designated at said other console and to generate said connect line identifying signal, whereby said battery reversal signal is generated on said signaling line.

9. An apparatus as recited in claim 7 wherein
said controller means is further responsive to each of said off-hook line identifying signals and operative, when said line identifying signal is generated by said selected console, when said off-hook line and said signaling line are not the same and when said dialed number signal has previously been generated for said off-hook line, to generate said display signal whereby a line identified by said previously generated dialed number signal is designated.

10. An apparatus for coupling calls on a first plurality of lines to a second plurality of lines, the apparatus comprising in combination:
a telephone call concentrator including first line interface means for connection to each of said first lines, said first line interface means having first line ringing signal detector means responsive to a ringing signal generated on an active one of said first lines and operative to generate a ringing detected signal, second line interface means for connection to each of said second plurality of lines, said second line interface means having ringing signal generator means responsive to a ring command signal designating a one of said second plurality of lines and operative to generate a ringing signal thereon, off-hook detector means responsive to an off-hook signal generated on said designated line and operative to generate an off-hook line identifying signal, calling line identifying signal generator means responsive to an identify command signal and operative to develop an active line identifying signal on said designated line, and connect signal detector means responsive to a connect signal developed on said designated line and operative to generate a connect signal detected signal and bridge means for connection to each of said first and said second plurality of lines, said bridge means being responsive to a bridge command signal and operative to bridge said active line to said designated line, said concentrator being responsive to said ringing detected signal and operative to select an idle one of said second plurality of lines and to generate said ring command signal, whereby said ringing signal is generated on said selected line, said concentrator being further responsive to said off-hook line identifying signal and operative when the line identified by said off-hook line identifying signal and said selected line are the same, to generate said identify command signal, and responsive to said connect signal detected signal and operative to generate said bridge command.

11. An apparatus as recited in claim 10 wherein said first plurality of lines contains at least twice as many members as said second plurality of lines.

* * * * *

UNITED STATES PATENT OFFICE
CERTIFICATE OF CORRECTION

Patent No. 4,256,928                  Dated March 17, 1981

Inventor(s) Ronald A. Lesea, Barrie Luttge, Austin H. Lesea

It is certified that error appears in the above-identified patent and that said Letters Patent are hereby corrected as shown below:

On the Title page, Item [73], "Durango Systems, Inc., San Jose, Calif." should read --- Assignee: Candela Electronics Sunnyvale, Calif. ---.

Signed and Sealed this

Twenty-ninth Day of December 1981

[SEAL]

*Attest:*

GERALD J. MOSSINGHOFF

*Attesting Officer*      *Commissioner of Patents and Trademarks*